United States Patent
Das et al.

(10) Patent No.: US 11,100,587 B2
(45) Date of Patent: Aug. 24, 2021

(54) SYSTEMS AND METHODS FOR DYNAMIC FUND ALLOCATION IN GOALS-BASED WEALTH MANAGEMENT PORTFOLIO

(71) Applicant: Franklin Advisors, Inc., San Mateo, CA (US)

(72) Inventors: Sanjiv R. Das, Santa Clara, CA (US); Daniel Ostrov, Santa Clara, CA (US); Anand Radhakrishnan, Hyderabad, CA (US); Deep R. Srivastav, San Mateo, CA (US)

(73) Assignee: Franklin Advisers, Inc., San Mateo, CA (US)

( * ) Notice: Subject to any disclaimer, the term of this patent is extended or adjusted under 35 U.S.C. 154(b) by 0 days.

(21) Appl. No.: 16/749,474

(22) Filed: Jan. 22, 2020

(65) Prior Publication Data

US 2020/0242697 A1    Jul. 30, 2020

Related U.S. Application Data

(60) Provisional application No. 62/796,747, filed on Jan. 25, 2019.

(51) Int. Cl.
  *G06Q 40/06* (2012.01)
  *G06Q 40/08* (2012.01)
  *G06F 16/248* (2019.01)
  *G06Q 10/06* (2012.01)

(52) U.S. Cl.
  CPC ............ *G06Q 40/06* (2013.01); *G06F 16/248* (2019.01); *G06Q 10/0635* (2013.01); *G06Q 10/06375* (2013.01); *G06Q 40/08* (2013.01)

(58) Field of Classification Search
  CPC ............... G06Q 40/06; G06Q 10/0635; G06Q 10/06375; G06Q 40/08; G06F 16/248
  USPC ................................................. 705/36 R
  See application file for complete search history.

(56) References Cited

U.S. PATENT DOCUMENTS

| | | | | |
|---|---|---|---|---|
| 7,062,458 B2* | 6/2006 | Maggioncalda | ....... | G06Q 40/00 705/36 R |
| 7,689,494 B2* | 3/2010 | Torre | ...................... | G06Q 40/06 705/36 R |
| 8,463,686 B2* | 6/2013 | Turner | ................... | G06Q 40/06 705/36 R |
| 8,498,913 B2* | 7/2013 | Jenson | ................... | G06Q 40/08 705/35 |
| 2003/0028466 A1* | 2/2003 | Jenson | ................... | G06Q 40/00 705/36 R |

(Continued)

OTHER PUBLICATIONS

Wu Gao et al., "The Portfolio Balanced Risk Index Model and Analysis of Examples of Large Scale Infrastructure Project", Hindawi Complexity, vol. 2017, Article ID 5174613, 13 Pages, https://doi.org/10.1155/2017/5174613, May 2017.*

*Primary Examiner* — Frantzy Poinvil
(74) *Attorney, Agent, or Firm* — Stradley Ronon Stevens & Young, LLP

(57) ABSTRACT

A system and method for implementation and maintenance of a dynamic goals-based investment portfolio. The system and method receive information from an investor, related to the individual goals they wish to achieve while avoiding personalized risk, and construct a portfolio to meet these goals. The system then continues to monitor the markets and interact with the investor to continuously adjust the portfolio holdings to maximize the likelihood that the portfolio will meet the investor's individual goals.

20 Claims, 9 Drawing Sheets

(56) References Cited

U.S. PATENT DOCUMENTS

| | | | |
|---|---|---|---|
| 2013/0346343 A1* | 12/2013 | Clouse .................. | G06Q 40/06 705/36 R |
| 2014/0279699 A1* | 9/2014 | Carosa .................. | G06Q 40/06 705/36 R |
| 2015/0228026 A1* | 8/2015 | Michael ................. | G06Q 40/06 705/36 R |
| 2016/0203559 A1* | 7/2016 | Carosa .................. | G06Q 40/06 705/36 R |

* cited by examiner

SYSTEMS AND METHODS FOR DYNAMIC FUND ALLOCATION IN GOALS-BASED WEALTH MANAGEMENT PORTFOLIO

CROSS-REFERENCE TO RELATED APPLICATION

This application claims the benefit of U.S. Provisional Application No. 62/796,747, filed Jan. 25, 2019, the content of which is incorporated herein by reference in its entirety.

FIELD

The invention relates to investments in general, and, in particular to the system and method for implementation and maintenance of a dynamic goals-based investment portfolio.

BACKGROUND

Each investor has individualized goals that they seek to realize. Conversely, each investor also has individualized risks that they wish to avoid. Furthermore, as time passes, the individual investor's priorities change. What may be a goal or perceived risk today may disappear and/or change tomorrow. Financial planning has trouble adapting to such individuality.

Traditionally, the financial industry, financial advisors, and academics in finance have anchored portfolio construction around the notion of achieving the highest level of return for a given level of risk with a specific final investment holding "goal", and "risk" defined as the standard deviation of an investor's portfolio. The industry utilizes these definitions because that can be standardized and mathematically modeled. Such modeling provides portfolios that seek to maximize the portfolio returns while minimizing the potential standard deviation of the portfolio. In other words, the portfolio is constructed based on a risk-return tradeoff.

As outlined above, investors have more individualized goals. For example, in addition to seeking a specific final return, an investor may not want their portfolio wealth to fall below a certain level. As a result, an investor typically defines "risk" as the likelihood of not attaining their personal goals. Such individualized goals and the related risk of not obtaining them do not lend themselves to universal mathematical modeling as no two investors will likely share the same goals while seeking to avoid the same risks.

In an attempt to bridge this gap in constructing portfolios to meet an investor's personal goals, Goals-Based Wealth Management (GBWM) framework/methodology was developed. GBWM refers to the management of an investor's portfolios with a view towards meeting the investor's financial goals, as opposed to only optimizing a risk-return tradeoff. For example, how can an investor maximize the probability of achieving any pre-defined portfolio wealth over a ten year period while at the same time avoiding falling below 80% of its original value. In this goal-based analysis, the investor's tolerance for portfolio swings is not ignored. Instead, it is incorporated into the construction of a portfolio along what is referred to as the "efficient frontier."

GBWM utilizes an efficient frontier that is based on the principle that it is possible to construct any portfolio that maximizes return for a given level of risk or minimizes risk for given level of return. Portfolios that take more risk to give the same level of returns are sub-optimal portfolios within the context of an efficient frontier. Plotting every value of $\mu$ with the corresponding minimum a results in a hyperbola in the ($\sigma$, $\mu$) plane. (The abscissa and the ordinate are the horizontal and vertical axes, respectively, typically the x-axis and y-axis of a two-dimensional graph. The plot, graph, or chart of desired return, $\mu$, against minimum risk, $\sigma$, typically places $\mu$ on the ordinate and $\sigma$ on the abscissa.) This hyperbola is known as the efficient frontier and depicts the portfolio with the lowest risk-return tradeoff required to obtain each $\mu$.

The abscissa and the ordinate are the horizontal and vertical axes, respectively, typically x-axis and y-axis of a two-dimensional graph.

In current GBWM portfolios, the portfolio is located somewhere on the efficient frontier based on the investor's desired returns and tolerance for risk. The portfolio is then statically maintained through periodic rebalancing of its holdings.

While most goals-based portfolios are still constructed to conform to a certain asset allocation, some goals-based portfolios are constructed to converge at a certain probability level calculated with the help of Monte Carlo simulations. In both cases they cannot adjust to the ever-changing market and investor goals. Thus, it is desirable to provide improved methods and systems related to dynamic goals-based portfolio construction and maintenance implementation that will automatically move about on the efficient frontier based on changes in market and/or investor goals.

SUMMARY

Illustrative and alternative embodiments of a computer-based system and method for the implementation of dynamic goals-based investment portfolios are disclosed. The system includes a software application linked to a financial advisor and/or an individual investor. The investor provides the application with the following information: (a) an investment timeframe, (b) an initial balance, (c) a target balance, (d) a minimum balance, (e) a first minimum probability factor defining the minimum probability that the investor will accept that the investment balance will meet or exceed the target balance at the end of the investment timeframe, (f) a second minimum probability factor defining the minimum probability that the investor will accept that the investment balance will meet or exceed the minimum balance at the end of the investment timeframe, (g) a first apportionment factor applicable to when the portfolio is on track to meet the investor's goals and defining whether the investor would like to try to maximize return, seek to increase the probability that they will meet their target goals, or pursue a more hybrid approach (e.g., 60% assigned to maximize returns and 40% assigned to meet goals), and (h) a second apportionment factor applicable to when the portfolio is not on track to meet the investor's goals and defining whether the investor would like to seek to increase the probability that the investment balance will meet or exceed the target balance at the end of the investment timeframe (i.e., get the portfolio back on track) versus increasing the probability that the investment balance will meet or exceed the minimum balance at the end of the investment timeframe.

The software application is further configured to communicate the subject information through a wired and/or wireless communication network to a server located at a site where an advisor is physically present or at a location remote from the site.

The system also includes a processor that is in communication through the wired and/or wireless communication network with the software application, as well as the server. The processer is configured to call up from a database of the system, upon communication of the subject information to the server: (a) a plurality of available financial assets to construct or amend the portfolio, (b) a constraint linked to each financial asset, (c) future projections or historical data linked to each financial asset, (d) present value of the assets from markets on which the assets are listed, (e) predetermined intervals at which the assets composition of the portfolio may be adjusted, and (f) set intervals at which the present value of the assets are reassessed. In each case, the available financial assets, constraints, future projections, historical data, predetermined intervals, and set intervals have been previously uploaded to the database by a financial advisor or an employee, contractor, or agent of the financial advisor.

Once the necessary information is collected, the processor determines a projected return and inherent risk for each asset based on the present value and future projections or historical data. The process next plots on an x-y chart at set intervals: (a) a goal threshold 100 based on the investment timeframe, investment balance, target balance, first minimum probability factor, and potential return and inherent risk for each financial asset, (b) a loss threshold 150 based on the investment timeframe, investment balance, target balance, second minimum probability factor, and potential return and inherent risk for each financial asset, and (c) an efficient frontier 400 based on the projected returns and inherent risks of all assets. Such plots provide the geometry upon which the system is built. Next, the processor identifies the relevant points to construct or reallocate the portfolio's target holdings ($\sigma$, $\mu$).

First, the processor determines an upper goal point 500 as the right-most intersection, if any, of the goal threshold 100 and the efficient frontier 400. In certain embodiments, the goal threshold 100 does not intersect the efficient frontier 400. In such embodiments, the upper goal point 500 is assigned to the origin point (i.e., (0, 0)).

Second, the processor determines a loss point 510, which will be the right-most intersection of the loss threshold 150 and the efficient frontier 400. In certain embodiments, the loss threshold 150 may intersect the efficient frontier 400 at two points. In such embodiments, the loss point 510 will be the point of intersection furthest to the right on the chart.

Third, the processor determines an optimal probability point 520 defined as a tangential point of intersection between the goal threshold 100a and the efficient frontier 400 achieved by increasing or decreasing the first minimum probability factor until tangency is achieved. The point of tangency is the optimal probability point 520.

Fourth, the processor determines a good-state point 530 by apportioning the distance between the optimal probability point 520 and the upper goal point 500 along the efficient frontier 400 based on the first apportionment factor. For example, as depicted in FIG. 5 if the investor advised that in a fully funded state—where the portfolio is on track to meet its goals—they wished to pursue a strategy equally divided between meeting their goals and maximizing return, the good-state point 530 would be located on the efficient frontier 400 halfway between the optimal probability point 520 and the upper goal point 500. The more the investor seeks to maximize returns, the closer the good-state point 530 is to the upper goal point 500 along the efficient frontier 400. Conversely, the more the investor seeks to maximize the probability of meeting their set goals, the closer the good-state point 530 is to the optimal probability point 520 along the efficient frontier 400.

Fifth, the processor determines a bad-state point 540 by apportioning the distance between the optimal probability point 520 and the loss point 510 along the efficient frontier 400 based on the second apportionment factor. For example, if the investor advised that in an underfunded state — where the portfolio is not on track to meet its goals—they wished to pursue a strategy equally divided between seeking to increase the probability of meeting their goals and protecting their investment balance, the bad-state point 540 would be located on the efficient frontier 400 halfway between the optimal probability point 520 and the loss point 510. The more the investor seeks to increase the probability of meeting their goals, the closer the bad-state point 540 is to the optimal probability point 520. Conversely, the more the investor seeks to protect their investment balance, the closer the bad-state point 540 would be to the loss point 510.

Sixth, the processor constructs or amends portfolio target ($\sigma$, $\mu$) based on the location of the upper goal point 500, loss point 510, and optimal probability point 520 within a range of tolerance. If the loss point 510 is to the right of the upper goal point 500, the processor constructs or adjusts the target ($\sigma$, $\mu$) of the portfolio to align with a risk-return profile of the good-state point 530. If the loss point 510 is to the left of the upper goal point 500, but to the right of the optimal probability point 520, the processor constructs or adjusts the target ($\sigma$, $\mu$) of the portfolio to align with the left-most point of: (a) the loss point 510 or (b) the good-state point 530. Finally, if the loss point 510 is to the left of the optimal probability point 520, the processor constructs or adjusts the target holdings ($\sigma$, $\mu$) of the portfolio to align with the bad-state point 540.

In certain embodiments, the investor may further provide the application with pre-determined infusions and/or withdrawals. The processor may then determine the effect different infusions or withdrawals will have on the probability of reaching the desired goal. For example, if an investor's initial balance is 100 k, their target balance is 200K, their investment timeframe is 10 years, their first minimum probability factor is 80%, and they are willing to contribute 10K every year towards the goal, the system may treat the 10K infusions as an array of guaranteed positive cashflows into the system. Such guaranteed cash flows would significantly affect the probability of the goals and the system would construct the appropriate portfolios for each year "considering" that these cashflows would happen every year. Conversely, the same investor may further provide the application with pre-determined withdrawals. For example, the investor may increase their timeframe to 15 years and have pre-determined 5K withdrawals in the final five years. Again, the system would incorporate these pre-determined withdrawals while constructing the appropriate portfolios for each year.

In certain embodiments, the processor continues to actively monitor at least one market on which an asset held in the portfolio is listed. The processor continues to compare the asset value to a holding threshold previously uploaded to the database by a financial advisor or an employee, contractor, or agent of the financial advisor. When the asset value crosses the holding threshold, within a reasonable degree of tolerance, the processor instructs the software application to notify the investor. In certain embodiments the rebalancing may be time-based, such as annual or half-yearly.

In certain embodiments, a system for optimizing the probability of a goals-based investment portfolio meeting a target balance is disclosed. Again, the system includes a software application operating on a mobile computer device or on a computer device, which is in communication with a financial advisor or investor. The application is configured to receive the following subject information from the investor:

(a) an investment timeframe, (b) an initial balance, (c) the target balance, (d) a minimum balance, (e) predetermined intervals at which the assets composition of the portfolio may be adjusted, (f) a minimum probability desired to meet the target balance, and (g) optionally, a maximum probability desired to meet the target balance. The software application is further configured to communicate the subject information through a wired and/or wireless communication network to a server located at a site where an advisor is physically present or at a location remote from the site.

The system further includes a processor that is in communication through the wired and/or wireless communication network with the software application, as well as the server. The processor is configured to recall from a database of the system, upon communication of the subject information to the server: (a) a plurality of available financial assets to construct or amend the portfolio, (b) a constraint linked to each financial asset, (c) future projections or historical data linked to each financial asset, (d) present value of the assets from markets on which the assets are listed, and (e) set intervals at which the present value of the assets are reassessed, wherein the available financial assets, constraints, future projections, historical data, and set intervals have been previously uploaded to the database by a financial advisor or an employee, contractor, or agent of the financial advisor. Next, within a reasonable time, not to exceed sixty (60) seconds, the processor is adapted to determine: (a) a target portfolio ($\sigma$, $\mu$) based on the present value and future projections or historical data; (b) a projected portfolio wealth value at each predetermined interval within; and (c) the probability that the projected portfolio wealth value will be greater than or equal to the target balance at the end of the investment timeframe. The processor then compares the probability of meeting the target balance at the end of the investment timeframe with the minimum probability and optionally the maximum probability. When the probability of meeting the target balance at the end of the investment timeframe is less than the minimum probability, the processor may determine a yearly infusion amount or one-time lumpsum infusion amount that will raise the probability of meeting the target balance at the end of the investment timeframe to at least the minimum probability. Optionally, when the probability of meeting the target balance at the end of the investment timeframe is greater than the maximum probability, the processor determines a yearly withdrawal amount or one-time lump sum withdrawal amount that will reduce the probability of meeting the target balance at the end of the investment timeframe to at least the maximum probability. Finally, the processor notifies the investor of the yearly infusion or optional yearly withdrawal amount. In another embodiment, the processor notifies the investor of a lumpsum one-time infusion or withdrawal.

In certain embodiments, the reasonable time does not exceed 30, 15, or 10 seconds.

In other embodiments, the application is further configured to receive the following subject information from the investor: (a) a bank account number, located at a bank, and a corresponding routing number, and (b) an authorization for the application to request withdrawals and make deposits to the bank account. In such embodiments, the processor is configured to instruct the application to transmit a request to the bank, including the bank account and the routing number, make an infusion from the bank account. In other embodiments, when the probability of meeting the target balance at the end of the investment timeframe is greater than the maximum probability, the processor determines a yearly withdrawal amount or one-time lumpsum withdrawal amount that will reduce the probability of meeting the target balance at the end of the investment timeframe to at least the maximum probability and the processor is configured to notify the investor if they wish to instruct the application to transmit a deposit to the bank for deposit into the bank account.

In other embodiments, the processor recalls a bankruptcy factor previously uploaded to the database by a financial advisor or an employee, contractor, or agent of the financial advisor. As outlined below, the bankruptcy factor reduces the computational time of the system. In certain embodiments, the bankruptcy factor is greater than or equal to 100 or is linked as a percentage of the minimum balance provided by the investor. For example, the bankruptcy factor may be set at 10%, 20%, 30%, 40%, or 50% of the minimum balance.

In other embodiments, a method for optimizing the probability of a goals-based investment portfolio meeting a target balance is disclosed. Such a method includes receiving the following individual investor goal profile that has been provided by an investor using a software application operating on a mobile computer device or a computer device that is synchronized with the mobile computer device: (a) an investment timeframe, (b) an initial balance, (c) the target balance, (d) a minimum balance, (e) predetermined intervals at which the assets composition of the portfolio may be adjusted, (f) a minimum probability desired to meet the target balance, and (g) optionally, a maximum probability desired to meet the target balance, whereby the mobile computer device and the computer device communicate with a remote server of the system located at a site where an advisor is physically present or at a location remote from the site through wired and/or wireless communication networks. Upon receiving the goal profile in the system, calling up: (a) a plurality of available financial assets to construct or amend the portfolio, (b) a constraint linked to each financial asset, (c) future projections or historical data linked to each financial asset, (d) present value of the assets from markets on which the assets are listed, and (e) set intervals at which the present value of the assets are reassessed, wherein the available financial assets, constraints, future projections, historical data, predetermined intervals, and set intervals have been previously uploaded to the database by a financial advisor or an employee, contractor, or agent of the financial advisor. The method includes actively monitoring at least one financial market on which each asset is traded. Furthermore, within a reasonable time, not to exceed sixty (60) seconds, the method determines: (a) a projected return and inherent risk for each asset based on the present value and future projections or historical data; (b) a projected portfolio wealth value at each predetermined interval within; (c) the probability that the projected portfolio wealth value will be greater than or equal to the target balance at the end of the investment timeframe. From these determinations, the method compares the probability of meeting the target balance at the end of the investment timeframe with the minimum probability and optionally the maximum probability. Based on these determination and comparisons when the probability of meeting the target balance at the end of the investment timeframe is less than the minimum probability, a yearly infusion amount or a one-time infusion amount that will raise the probability of meeting the target balance at the end of the investment timeframe to at least the minimum probability is determined. In addition, optionally, when the probability of meeting the target balance at the end of the investment timeframe is greater than the maximum probability, a yearly withdrawal amount or a one-time lumpsum withdrawal amount that will reduce the probability of meeting the target balance at the end of the investment timeframe to at least the maximum probability is determined. Finally, the investor is notified of the yearly infusion or one-time infusion or optional yearly withdrawal amounts or one time lumpsum withdrawal amounts.

These and other features, aspects and advantages of the present invention will become better understood with reference to the following description and appended claims.

BRIEF DESCRIPTION OF THE DRAWING

The invention is best understood from the following detailed description when read in connection with the accompanying drawing. Included in the drawing are the following figures.

The patent or application file contains at least one drawing executed in color. Copies of this patent or patent application publication with color drawing(s) will be provided by the Office upon request and payment of the necessary fee.

DETAILED DESCRIPTION

Figure 1:
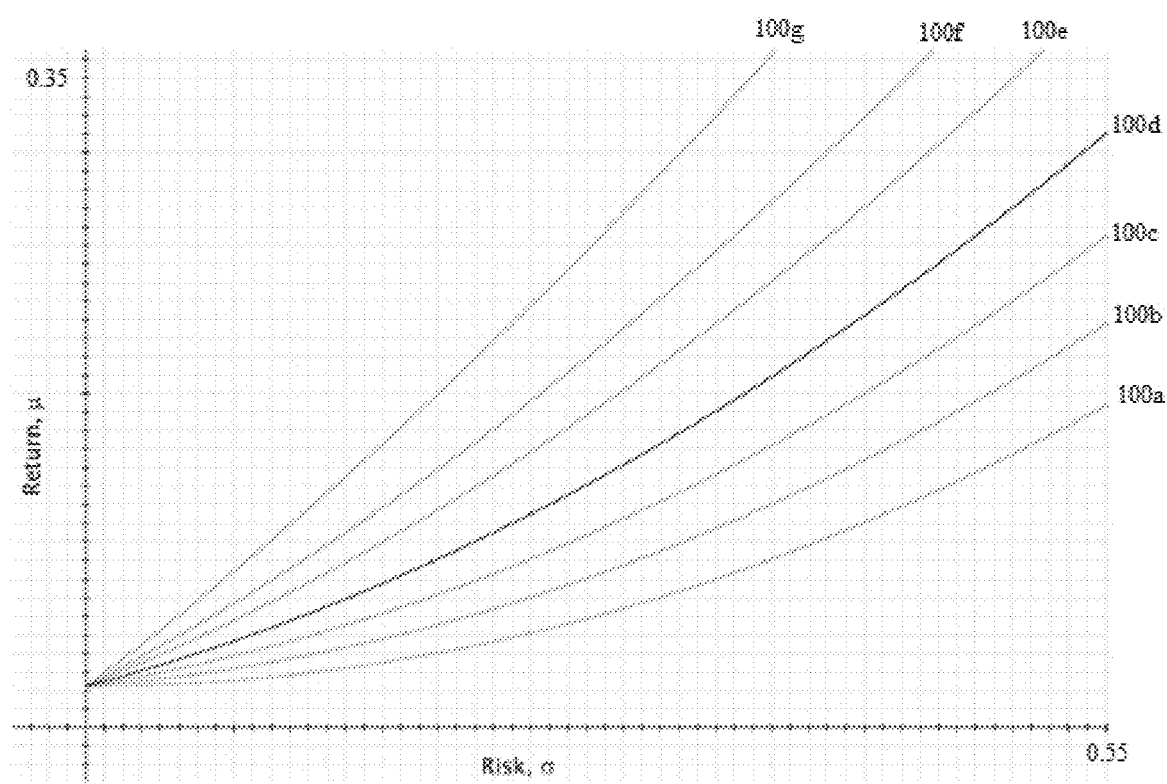
FIG. 1 shows a chart depicting the effect the first minimum probability factor has on the goal threshold with the goal threshold steepening as the first minimum probability increases.

Various embodiments of the invention are described in detail below. Although specific implementations are described, it should be understood that this disclosure is provided for illustration purposes only. A person skilled in the relevant art will recognize that other components and configurations may be used without parting from the spirit and scope of this disclosure.

The invention provides a solution for the present need in the art for systems, methods, and devices for the dynamic goals-based portfolio construction and maintenance that will automatically move about on the efficient frontier 400 based on changes in market and/or investor goals. The invention solves the prior art problems using a computer-based platform that is specially programmed to construct and maintain a dynamic goals-based portfolio that monitors changes in financial markets and/or investor goals and proactively adjusts the portfolio holdings to maximize the likelihood of meeting the investor's goals.

The system synchronizes information from a server located at or connected to an advisor with the ever-changing market to chart a portfolio pathway that is most likely to meet an investor's ever-evolving goals. Such an approach requires a re-evaluation of the definition of "risk."

Because the view of risk outlined in this application is connected to the probability of not achieving goals, instead of just the volatility of an investor's portfolio, the approach outlined differs significantly from current approaches to goals-based investing. In traditional investment strategies, the system gravitates towards the least volatile portfolio. Such gravitation does not correspond to the safest choice for meeting the goals of the investor. Indeed, as the risk is reduced, the probability of meeting the investor's goals may similarly decrease, i.e. goals-based risk is increased. Conversely, the approach outlined in this disclosure connects how the probability of attaining an investor's goals corresponds to a specific interval of risk-return combinations on the efficient frontier 400. The optimal risk allocation in the present system is counter-intuitive in the sense that when the portfolio is far from its goal due to underperformance, risk is increased in order to enhance the probability of reaching the goal, and when the portfolio is outperforming, risk is curtailed to reduce the risk of missing the goal. The disclosed system dynamically adjusts to different situations to maximize the likelihood of meeting the investor's goals, unlike prior static systems that would retreat from—rather than adjust to—difficult market conditions.

A detailed discussion of the methods and systems of the invention is provided below. First, a system overview is provided. Second, the building blocks of the system are outlined. Third, the manner in which an investor can interact with the system is identified. Fourth, discussion of the system components occurs. Fifth, a description of a cloud computing system, the preferred environment of this system, follows. Sixth, elements to further increase investor engagement, which may be incorporated into the system, are delineated.

System Overview

A system for constructing and dynamically maintaining an investment balance of a goals-based investment portfolio is disclosed. The system includes a software application that obtains private information from an investor and a processor and creates individualized portfolios based on the investor's preferences. Indeed, no two portfolios will likely be the same. In certain embodiments, the system constructs and dynamically maintains the most ideal portfolio from a given finite set of choices to cater to personal asset allocation choices.

The software application obtains the following information from the investor: (a) an investment timeframe, (b) an initial balance, (c) a goal (e.g., a target balance), (d) a minimum balance, (e) a minimum probability that the investor will accept that they will achieve their goal, (f) a minimum probability that the investor will accept that the investment balance will meet or exceed the minimum balance, (g) the division between pursuing a strategy of maximizing returns versus meeting goals that the investor wishes to pursue when the portfolio is fully funded (i.e., on target to meet their goals), and (h) the division between minimizing losses and meeting goals when the portfolio is underfunded (i.e., not on target to meet their goals). This information is then sent to the processor.

Upon receipt of the information, the processor recalls the following data previously uploaded to the database by a financial advisor or an employee, contractor, or agent of the financial advisor: (a) assets that can be used to construct the portfolio and any constraints related to those assets (e.g., purchased in a certain bulk or by a specific type of investor, held for a specified length of time, etc.), (b) future projections or historical data linked to each asset, (c) present value of the assets from markets on which the assets are listed, (d) predetermined intervals at which the asset composition of the portfolio may be adjusted, and (f) set intervals at which the present value of the assets is reassessed.

Using the above information, the processor creates the three building blocks required for the system: (1) the goal threshold 100, (2) the loss threshold 150, and (3) the efficient frontier 400.

Goal Threshold and the Loss Threshold

Both the goal threshold 100 and the loss threshold 150 are products of Equation 1:

$$\mu = \frac{1}{2}\sigma^2 + \frac{z_0}{\sqrt{t}}\sigma + \frac{1}{t}\ln\left(\frac{W(t)}{W(0)}\right) \quad \text{Equation 1}$$

In calculating the goal threshold 100, $\mu$ is the portfolio expected return, $\sigma$ is the portfolio volatility, t is the investment timeframe, W(0) is the initial balance, W(t) is the target balance, and z is a random variable that corresponds to minimum probability that the investor will accept that they will achieve their target wealth. In calculating the loss threshold 150 using Equation 1, $\mu$ is the portfolio expected return, $\sigma$ is the portfolio volatility, t is the investment timeframe, W(0) is the initial balance, W(t) is the minimum balance, and z is a standard normal variable that corresponds to the minimum probability that the investor will accept that, at the end of the investment timeframe the investment balance will be at or above the minimum balance. As the minimum probability that the investor will accept that (1) they will achieve their goal, or (2) at the end of the investment timeframe, the investment balance will be at or above the minimum balance increases, the steepness of the goal and loss thresholds 150 increases. For example, FIG. 1 depicts the impact that increasing the minimum probability has on Equation 1. Specifically, FIG. 1 depicts minimum goals from 50% 100a, 60% 100b, 70% 100c, 80% 100d, 90% 100e, 95% 100f, and 99% 100g.

Figure 2:
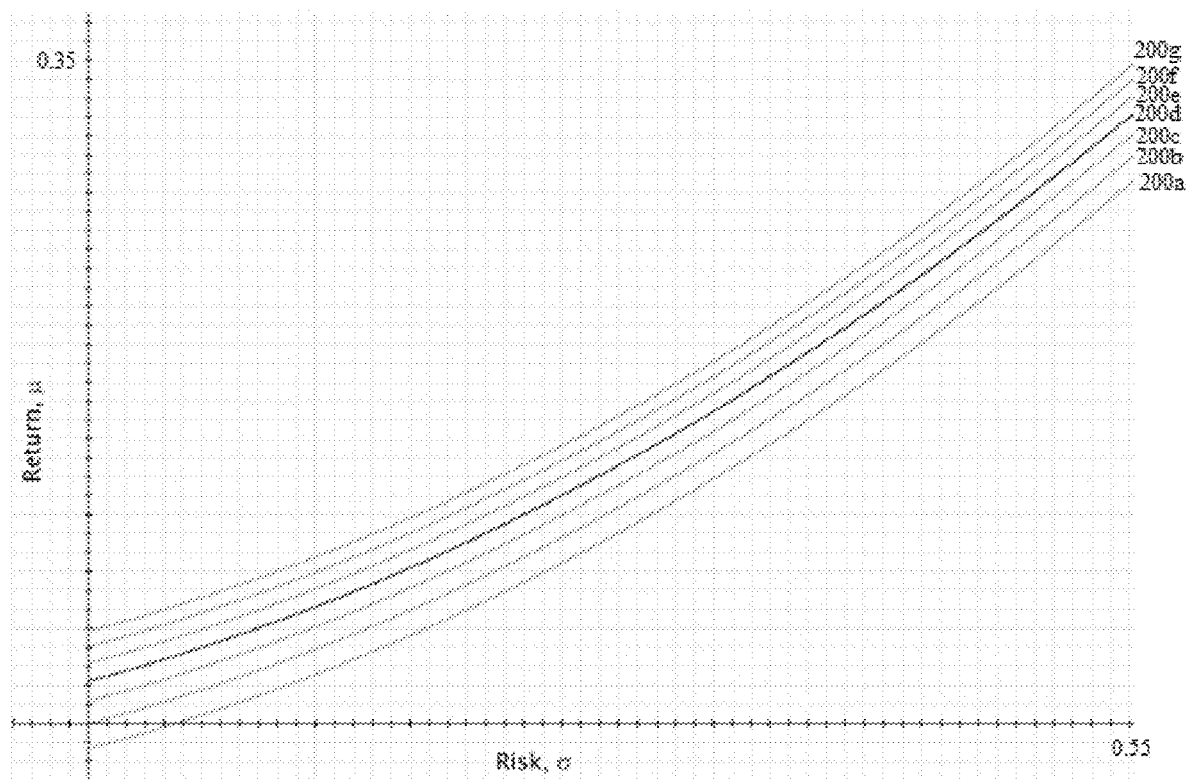
FIG. 2 shows a chart depicting the effect the increase in target wealth has on the goal threshold with the height of the goal threshold increasing as the target wealth increases.

As the target balance and minimum balance increase, the height of the goal and loss thresholds 150 increases. Specifically, FIG. 2 depicts balances of 350K 200a, 400K 200b, 450K 200c, 500K 200d, 550K 200e, 600K 200f, and 650K 200g.

Figure 3:
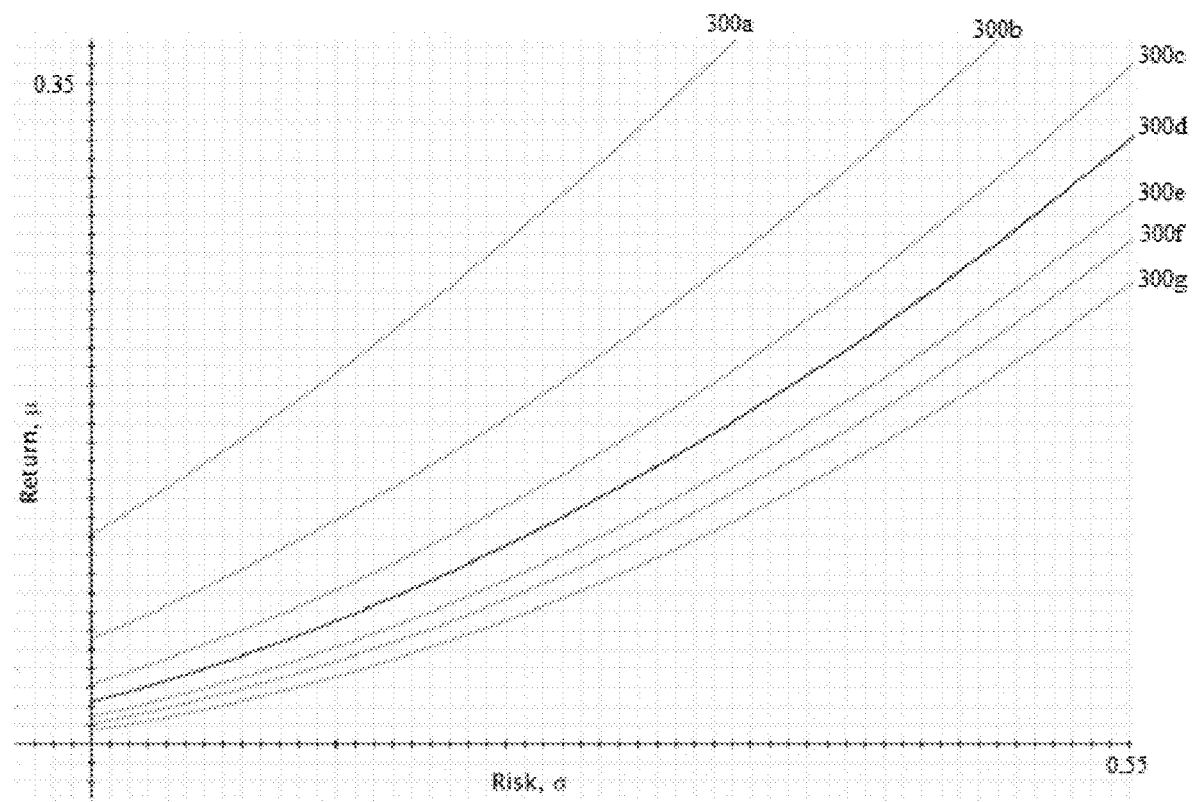
FIG. 3 shows a chart depicting the effect the increase in investment timeframe has on the goal threshold with the height and steepness of both decreasing as the investment timeframe increases.
Figure 4:
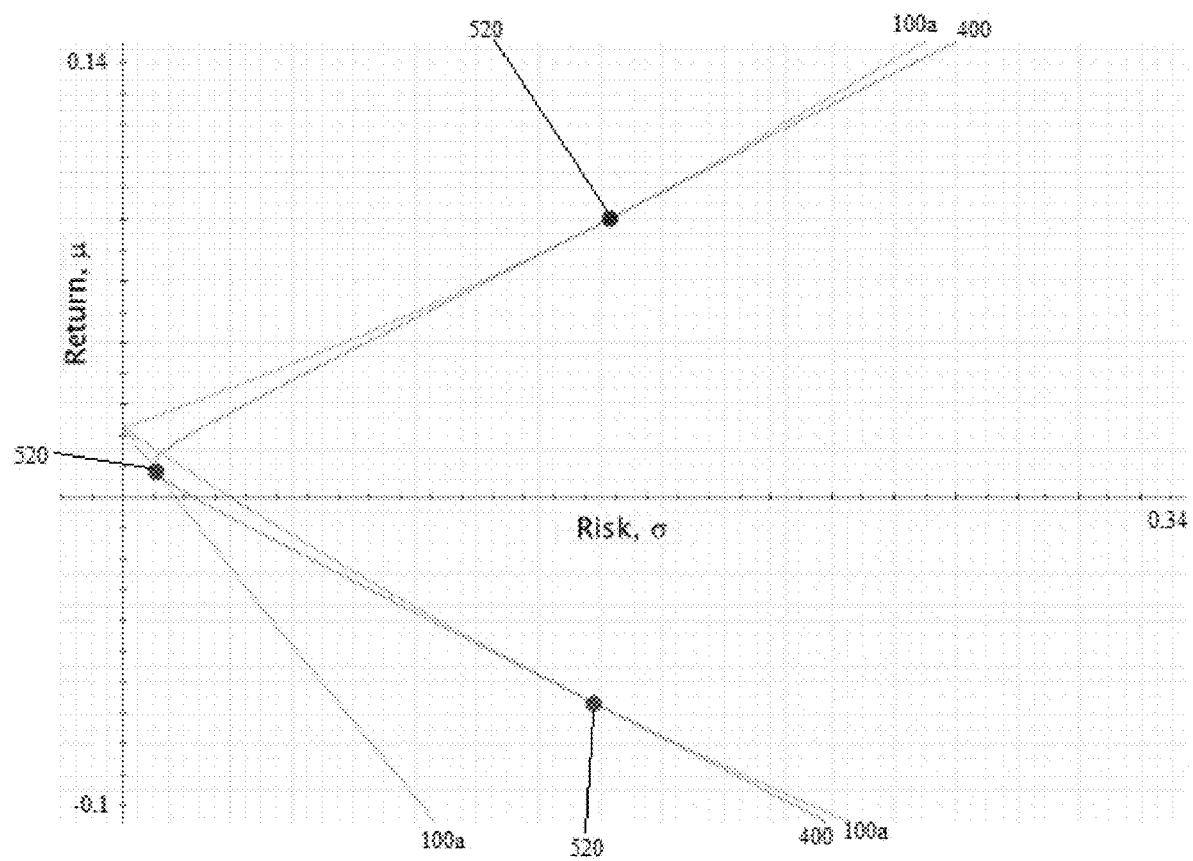
FIG. 4 shows a chart depicting the manner by which the optimal probability point is identified from three real roots.
Figure 5:
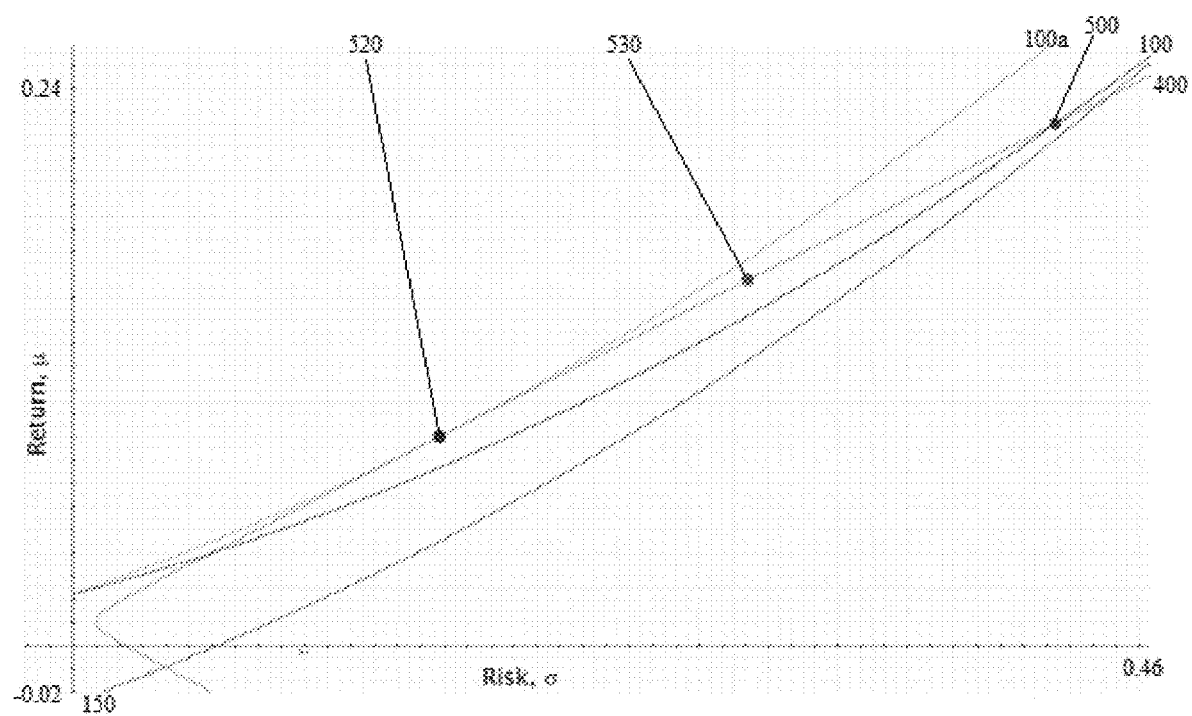
FIG. 5 shows a chart with the loss point to the right of the upper goal point.
Figure 6:
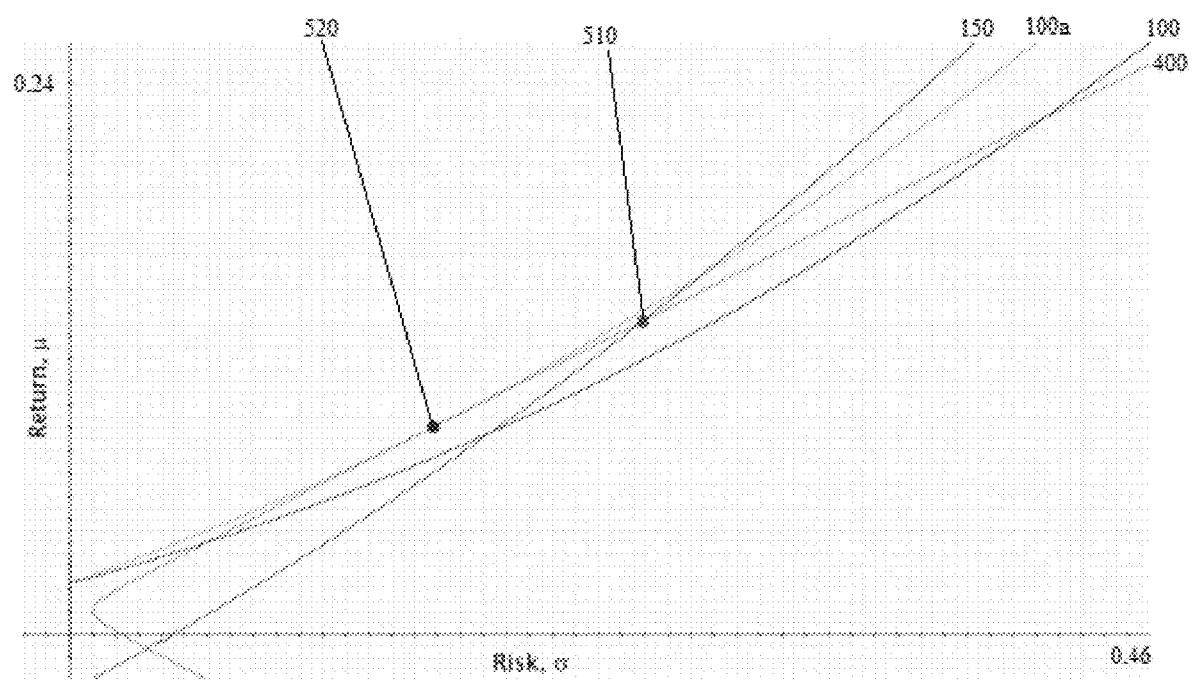
FIG. 6 shows a chart with the loss point to the left of the upper goal point but to the right of the optimal probability point.
Figure 7:
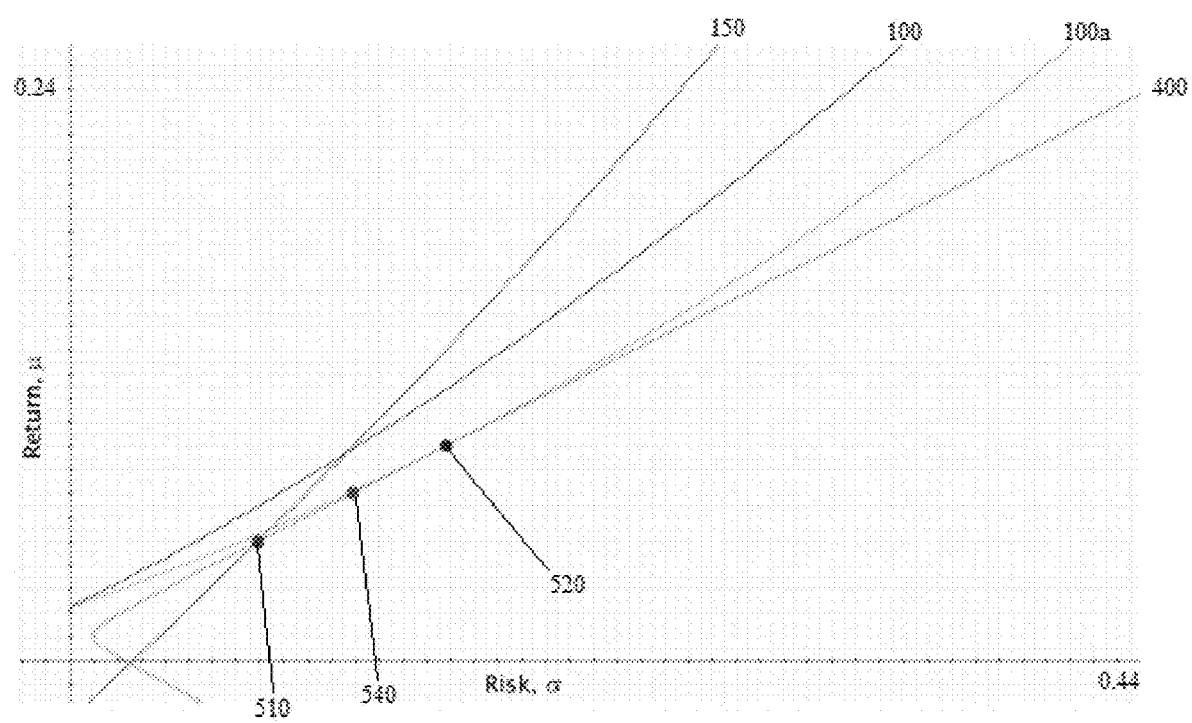
FIG. 7 shows a chart with the loss point to the left of the optimal probability point.
Figure 8:
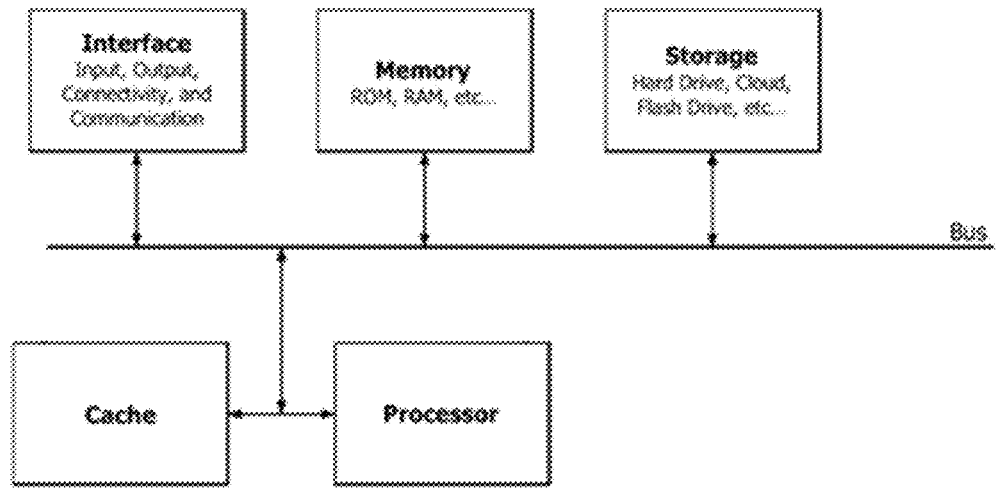
FIG. 8 shows the hardware components of the system of the invention.

Increasing the investment time not only flattens both the goal and loss thresholds 150 but it lowers both thresholds as well. Indeed, FIG. 3 depicts such a flattening for time periods of two years 300a, four years 300b, seven years 300c, 10 years 300d, 15 years 300e, 20 years 300f, and 30 years 300g.

Efficient Frontier

The efficient frontier 400 is a product of Equation 2:

$$\sigma = \sqrt{a\mu^2 + b\mu + c} \quad \text{Equation 2}$$

Equation 2 assumes that a hypothetical portfolio has access to n assets. Furthermore, constants a, b, and c are defined by: (1) M, which is a vector of the expected returns of n; (2) O, which is a vector of the ones of n; and $\Sigma$, which is the covariance matrix of the n assets via Equations 3-5:

$$a = h^T \Sigma h \quad \text{Equation 3}$$

$$b = 2g^T \Sigma h \quad \text{Equation 4}$$

$$c = g^T \Sigma g \quad \text{Equation 5}$$

Vectors g and h are further defined by Equations 6 and 7:

$$g = \frac{l\Sigma^{-1}O - k\Sigma^{-1}M}{lm - k^2} \quad \text{Equation 6}$$

$$h = \frac{m\Sigma^{-1}M - k\Sigma^{-1}O}{lm - k^2} \quad \text{Equation 7}$$

Scalars k, l, and m are further defined by Equations 8-10:

$$k = M^T \Sigma^{-1} O \quad \text{Equation 8}$$

$$l = M^T \Sigma^{-1} M \quad \text{Equation 9}$$

$$m = O^T \Sigma^{-1} O \quad \text{Equation 10}$$

In certain embodiments, additional restrictions may be imposed upon the efficient frontier 400. For example, asset holdings might be restricted to only long positions. Such restrictions typically have only a small effect on the efficient frontier 400. Such restrictions might impose a maximum value, however, beyond which the hyperbolic maximum value of the efficient frontier 400 is cut off.

The present system will only construct portfolios that lie upon, within a range of tolerance, the potentially restricted efficient frontier 400. With the above building blocks, the processor determines the necessary five points to construct a portfolio that is mean-variance efficient.

Identification of Upper Goal Point and Loss Point

An upper goal point 500 is the right-most intersection, if any, of the goal threshold 100 and the efficient frontier 400. The processor also determines a loss point 510 as the right-most intersection of the loss threshold 150 and the efficient frontier 400.

Identification of the Optimal Probability Point

The processor determines an optimal probability point 520 defined as a tangential point of intersection between the goal threshold 100a and the efficient frontier 400 achieved by increasing or decreasing the first minimum probability factor until tangency between the goal threshold 100 and the efficient frontier 400 is achieved.

To calculate the optimal probability point 520, Equation 1 is rearranged to provide Equation 11:

$$z(\sigma, \mu) = \frac{1}{\sigma}\left(\left(\mu - \frac{\sigma^2}{2}\right)\sqrt{t} - \frac{1}{\sqrt{t}}\ln\left(\frac{W(t)}{W(0)}\right)\right) \quad \text{Equation 11}$$

Next, the processor seeks to optimize z subject to the restrictions, if any, that remain on the efficient frontier 400 given in Equation 2 to yield Equation 12:

$$g(\sigma,\mu) = a\mu^2 + b\mu + c - \sigma^2 = 0 \quad \text{Equation 12}$$

Solving Equation 11 and 12 requires employing the method of Lagrange multipliers, and yields Equation 13:

$$\nabla z(\sigma,\mu) = \lambda \nabla j(\alpha,\alpha) \quad \text{Equation 13}$$

From Equation 13, using Equations 11 and 12 and differentiating with respect to a subject to the efficient frontier 400 restriction g(σ,μ)=0 yields:

$$-\frac{1}{\sigma^2}\left(\mu\sqrt{t} - \frac{1}{\sqrt{t}}\ln\left(\frac{W(t)}{W(0)}\right)\right) - \frac{\sqrt{t}}{2} = -2\lambda\sigma \quad \text{Equation 14}$$

Similarly, from Equation 13, using Equations 11 and 12 and differentiating with respect to p subject to the efficient frontier 400 restriction g(σ,μ)=0 yields:

$$\frac{\sqrt{t}}{\sigma} = \lambda(2a\mu + b) \quad \text{Equation 15}$$

Combining Equations 14 and 15 to remove λ, and after rearrangement yields:

$$2\sqrt{t}\,\sigma^2 = \left(\mu\sqrt{t} - \frac{1}{\sqrt{t}}\ln\left(\frac{W(t)}{W(0)}\right) + \frac{\sqrt{t}}{2}\sigma^2\right)(2a\mu + b) \quad \text{Equation 16}$$

Substituting the efficient frontier 400 restriction (i.e., aμ²+bμ+c) for σ² and rearranging yields the following a third-degree polynomial equation (i.e., a cubic equation for the value of μ):

$$c_3\mu^3 + c_2\mu^2 + c_1\mu + c_0 = 0 \quad \text{Equation 17}$$

In Equation 17:

$$c_3 = a^2 \quad \text{Equation 18}$$

$$c_2 = \frac{3ab}{2} \quad \text{Equation 19}$$

$$c_1 = ac + \frac{b^2}{2} - b - \frac{2a}{t}\ln\left(\frac{W(t)}{W(0)}\right) \quad \text{Equation 20}$$

$$c_0 = \frac{bc}{2} - 2c - \frac{b}{t}\ln\left(\frac{W(t)}{W(0)}\right) \quad \text{Equation 21}$$

In general, Equation 17 has either one real (and two complex) roots or three real roots. From the geometry of Equation 13, each of the real roots of Equation 17 must correspond to locations where the goal threshold 100a and efficient frontier 400 are at a tangent to each other. Because goal thresholds 100 are convex parabolas, where there is only one real root or three real roots, the optimal probability point 520 will always be the point on the upper half of the efficient frontier 400 where μ≥−(b/(2a)). This root, which may be found using Cardano's formula for cubic equations or approximated using a numerical solver, is the μ coordinate of the optimal probability point 520. The corresponding α is determined from Equation 2.

User's Personalized Good-State Point

With those three points, the processor determines a good-state point 530 by apportioning the distance between the optimal probability point 520 and the upper goal point 500 along the efficient frontier 400 based on the first apportionment factor. For example, if the investor indicates that in a fully funded state, they wish to pursue a strategy of 70% in favor of maximizing returns in relation to 30% maximizing the probability that the investment balance at the end of the investment timeframe will be at or above the target balance, then the processor will locate the good-state point 530 a distance 70% up the efficient frontier 400 from the optimal probability point 520 towards the upper goal point 500.

In certain embodiments, the only limit on personalization is that the division assigned by the investor between maximizing returns versus maximizing the probability that the investment balance at the end of the investment timeframe will be at or above the target balance equals 100. For example, the investor may evenly split the division 50/50 between each desired outcome. In other embodiments, the default split between each desired outcome is 50/50.

User's Personalized Bad-State Point

The processor will also determine a bad-state point 540 by apportioning the distance between the optimal probability point 520 and the loss point 510 along the efficient frontier 400 based on the second apportionment factor. For example, if the investor indicates that in an underfunded state, they wish to pursue a strategy 70% in favor of protecting the portfolio balance from falling below the minimum balance as opposed to 30% maximizing the probability that the investment balance at the end of the investment timeframe will be at or above the target balance, then the processor will locate the bad-state point 540 a distance 30% up the efficient frontier 400 from the loss point 510 towards the optimum probability point 520.

Again, in certain embodiments, the only limit on personalization is that the division assigned by the investor between protecting the portfolio balance from falling below the minimum balance as opposed to the probability that the investment balance at the end of the investment timeframe will be at or above the target balance equals 100. For example, the investor may evenly split the division 50/50 between each desired outcome. In other embodiments, the default split between each desired outcome is 50/50.

Portfolio Construction

As is the case, constructing the portfolio may include selecting a portfolio from a given finite set of choices or building from scratch. If the portfolio is constructed from scratch, then along with constructing the most ideal portfolio at a given point in time, the processor also has to construct a number of variants all along the same efficient frontier with the different asset allocations such that the system can chart the optimal portfolio choice for each year/period in the future as well. In certain embodiments, where the portfolio is constructed from scratch, the processor may construct at least 15 variants of the portfolio along the same efficient frontier. Alternatively, the most ideal portfolio can be "selected" as well from a given finite set of choices. As a result, the system can be used by an investor who would want to use their own portfolios and still achieve goals based wealth management with the only pre-condition being all the portfolios fed into the system should be part of the same efficient frontier.

In other embodiments, the processor may graph the probability of portfolio success and visually display such information to the investor at predetermined intervals previously uploaded by the investor or the financial advisors or their agents or employees. Such predetermined intervals may be continuous. Such visual depictions may take the form of the graphs depicted in FIGS. 10 and 11.

Regardless of whether the portfolio is constructed or selected, with the five relevant points now identified, the processor will select or construct the portfolio in the most ideal way based on the location of the points. For example, when the loss point 510 is to the right of the upper goal point 500, the processor constructs or adjusts the holdings of the portfolio to align with a risk-return profile of the good-state point 530. When the loss point 510 is to the left of the upper goal point 500 but to the right of the optimal probability point 520, the processor constructs or adjusts the holdings of the portfolio to align with the left-most point of: (a) the loss point 510 or (b) the good-state point 530. Finally, when the loss point 510 is to the left of the optimal probability point 520, the processor constructs or adjusts the holdings of the portfolio to align with the bad-state point 540.

In certain embodiments, the processor will further evaluate the portfolio and transmit via wired or wireless communications purchase and/or sale instructions to brokers thereby aligning the portfolio's holdings with the risk-return profile identified by the system.

Time Limitations

After the portfolio is constructed, the holdings must be continuously monitored so that the probability of reaching the desired goal remains as high as possible. However, such monitoring must be accomplished within a reasonable time frame. The market is ever changing, and a system that takes an hour to determine the best path forward now may be useless at that later time. In certain embodiments, the processor continues to compare the asset value to a holding threshold previously uploaded to the database by a financial advisor or an employee, contractor, or agent of the financial advisor. When the asset value crosses the holding threshold, within a reasonable degree of tolerance, the processor instructs the software application to notify the investor. Although the processor may be consistently monitoring and/or evaluating different markets, portfolio rebalancing may only occur quarterly, bi-annually, or annually.

Creation of Wealth Grid within Time Limits

To optimize the probability of reaching the portfolio's goal, within the compressed time frames discussed above, the processor is adapted to: (1) evaluate the portfolio wealth values at discrete time values, t, (2) identify the probability of transitioning to different wealth levels, W(t), at future points in time, t+1, (3) identify probability of meeting the desired goal using the current strategy, $p(W_j(t+1))$, (4) compare the probability of meeting the desired goal using the current strategy to a maximum and minimum desired probability for obtaining the goal previously received by the application from the investor, (5) determine the effect different infusions or withdrawals will have on the probability of reaching the desired goal, and (6) if the probability of meeting the desired goal without the infusions or withdrawals is outside of the desired probability range, transmit a notification to the investor via wired or wireless communications advising the investor of the likelihood of meeting the desired goal and advising how infusions or withdrawals will impact such probabilities. Furthermore, the processor is adapted to accomplish such functionality within a reasonable time, which may be less than a minute, less than 45 seconds, less than 30 seconds, or less than 10 seconds.

The discrete time values employed by the system for evaluation purposes may be yearly, however, the application may receive different evaluation intervals, h, from the investor, or different intervals may be accessible from a database having been previously uploaded to the database by a financial advisor or an employee, contractor, or agent of the financial advisor. For evaluation purposes, t will always be an integer, t=0, 1, 2, . . . , T and h will designate the evaluation intervals where h equals 1 divided by the number of evaluations desired per year. For example, if h=0.25—quarterly updates—then t=4 corresponds to the state of the portfolio after one year. Furthermore, for quarterly updates where h=0.25, T=40 designates the time horizon of the portfolio as 10 years.

The processor is adapted to construct an index, i, for discrete wealth points, $W_i(t)$, at specific times, t. The index, i, is a member of the set $\{-i_{max}(t), -i_{max}(t)+1, \ldots, -1, 0, 1, \ldots, i_{max}(t)-1, i_{max}(t)\}$. Since the user provides the initial wealth, $W_{init}$, at t=0, $i_{max}(0)=0$, and $W_0(0)=W_{init}$. To map out the potential evolution of the portfolio's value as a result of the market's random walk, the processor utilizes a stochastic model. For example, the processor may use geometric Brownian motion. That is, the processor may evaluate the potential for future wealth, W(t), as follows:

$$W(t) = W(0)e^{\left(\mu-\frac{\sigma^2}{2}\right)t+\sigma\sqrt{t}\,Z} \qquad \text{Equation 22}$$

It should be noted that Z is a standard normal random variable.

For situations in which the desired updates, h, are not annual, h is incorporated into Equation 22 as follows:

$$W(t) = W(0)e^{\left(\mu-\frac{\sigma^2}{2}\right)ht+\sigma\sqrt{ht}\,Z} \qquad \text{Equation 23}$$

Due to time limitations outlined above and because the probability that |Z|>3 is so small, the processor may restrict Z to $3.5 \geq Z \geq -3.5$ or $3 \geq Z \geq -3$. Such restrictions permit the processor to function within the desired time frame.

Next, the processor constructs a grid whose smallest value corresponds to the value of W(1) in Equation 22 where t=1, Z=-3.5, $W(0)=W_{init}$, $\mu=\mu_{min}$, and σ equals the largest value it can take, which is the value of σ when $\mu=$, $\mu_{max}$ in Equation 2. The processor sets this smallest value of W(1), equal to $W_{-imax(1)}(1)$. The processor also determines the largest value of W(1) and set it equal to $W_{imax(1)}(1)$ utilizing Equation 22 where t=1, Z=3.5, $W(0)=W_{init}$, $\mu=\mu_{max}$, and σ again equals the largest value it can take, which is when $\mu=\mu_{max}$ in Equation 2. To reduce run times, the processor may further set Z=-3 when determining $W_{-imax(1)}(1)$ and Z=3 when determining $W_{imax(1)}(1)$.

In addition, because projections will be at set intervals wherein $i_{max}(t)=t(i_{max}(1))$ the processor may link $i_{max}(1)$ to h as a designated ratio to comply with the time limitations outlined above. Such a ratio of $i_{max}(1)$ to h may be 25:1. In other embodiments, a ratio of $i_{max}(1)$ to h may be greater than 60:1. For example, if h=0.20, $i_{max}(1)$ may equal 5. In certain embodiments, h may equal 0.25 which essentially means quarterly rebalancing.

With the $-i_{max}(1)$ and $i_{max}(1)$ endpoints, the processor identifies the intermediate grid points, where $-i_{max}(1) < i < i_{max}(1)$ using Equation 24 below:

$$\frac{\ln(W_i(1))-\ln(W_{-imax(1)})}{\ln(W_{imax(1)})-\ln(W_{-imax(1)})} = \frac{i-(-i_{max}(1))}{2i_{max}(1)} \qquad \text{Equation 24}$$

It should be noted that the processor uses the logarithm of wealth instead of wealth because Z corresponds to proportional changes in the logarithm of the wealth in Equations 22 and 23.

For t=2, 3, . . . , T the processor follows a similar procedure, however, because the processor now has to account for portfolio gains or losses, C(t-1), Equation 22 becomes:

$$W(t) = (W(t-1) + C(t-1))e^{\left(\mu - \frac{\sigma^2}{2}\right) + \sigma Z} \quad \text{Equation 25}$$

Again, to determine $W_{-imax(t)}$, the processor determines W(t) in Equation 25 by setting $W(t-1)=W_{-imax(t-1)}$, Z=3.5, $\mu=\mu_{min}$, and σ again equals the largest value it can take. To determine $W_{imax(t)}$, the processor again determines W(t) in Equation 25 after setting $W(t-1)=W_{imax(t-1)}$, Z=3.5, $\mu=\mu_{max}$, and σ again equals the largest value it can take. Again, the processor employs the same interpolation procedure used in Equation 24 to determine the intermediate grid points between $W_{-imax(t-1)}$ and $W_{imax(t-1)}$.

Again, for situations in which h is not 1 (i.e., non-annual updates), h is incorporated into $$W(t) = (W(t-1) + C(t-1))e^{\left(\mu - \frac{\sigma^2}{2}\right)h + \sigma\sqrt{h} Z} \quad \text{Equation 26}$$

In both Equation 25 and 26, the cash flows C(t) may be positive infusions or negative withdrawals. Furthermore, the cash flows may be recurring, such as automatic deposits from a paycheck, or investor initiated, such as a single infusion 5 years after the portfolio is set up. Furthermore, the processor is adapted to determine and notify the investor of the effect proposed infusions or withdrawals will have on the probability that the investor will achieve their ultimate goal.

Optimization of Obtaining Goals

The processor is further adapted to optimize the probability that the investor will attain their goal wealth, G, or more at the end of the time horizon, T, given the investor has a worth W(t) at time t. This means that at time T, $$V(W_i(T)) = \begin{cases} 0 \text{ if } W_i(T) < G \\ 1 \text{ if } W_i(T) \geq G \end{cases} \quad \text{Equation 27}$$

To optimize the probability, the processor utilizes a Bellman equation to determine V at year t=T-1, then t=T-2, etc., iterating backwards in time until t=0. Specifically, the processor determines the transition probabilities $p(W_j(t+1)|W_i(t), \mu)$ which are the normalized relative probabilities that the investor will be at the wealth node $W_j(t+1)$ at time t+1 if the investor starts at the wealth node $W_i(t)$ at time t and between times t and t+1, the portfolio is run with an expected return of μ and its corresponding volatility, σ, from Equation 2.

Defining φ(z) to be the value of the probability density function of the standard normal random variable at Z=z, Equation 25 becomes:

$$p(W_j(t+1)|W_i(t), \mu) = \phi\left(\frac{1}{\sigma}\left(\ln\left(\frac{W_j(t+1)}{W_i(t)+C(t)}\right) - \left(\mu - \frac{\sigma^2}{2}\right)\right)\right) \quad \text{Equation 28}$$

Normalizing these probability density function values yields the following desired transition probabilities:

$$p(W_j(t+1)|W_i(t), \mu) = \frac{\tilde{p}(W_j(t+1)|W_i(t), \mu)}{\sum_{k=-i_{max}(t+1)}^{i_{max}(t+1)} \tilde{p}(W_k(t+1)|W_i(t), \mu)} \quad \text{Equation 29}$$

For situations in which h is not 1 (i.e., non-annual updates), h is incorporated into Equation 28 as follows:

$$p(W_j(t+1)|W_i(t), \mu) = \quad \text{Equation 30}$$
$$\phi\left(\frac{1}{\sigma\sqrt{h}}\left(\ln\left(\frac{W_j(t+1)}{W_i(t)+C(t)}\right) - \left(\mu - \frac{\sigma^2}{2}\right)h\right)\right)$$

Since V(W(t)) is the expected value of V(W(T)), the Bellman equation simplifies to:

$$V(W_i(t)) = \quad \text{Equation 31}$$
$$\max_{\mu \in [\mu_{min}, \mu_{max}]} \left[\sum_{j=-i_{max}(t+1)}^{j=i_{max}(t+1)} V(W_j(t+1)) p(W_j(t+1)|W_i(t), \mu)\right]$$

It should be noted that $\mu_{i,t}$ is denoted as the value of at which the maximum is attained in the Bellman equation, and $\sigma_{i,t}$ is, of course $\mu_{i,t}$'s corresponding volatility on the efficient frontier 400 as calculated in Equation 2. Furthermore, due to the time limitations outlined above, the interval $[\mu_{min}, \mu_{max}]$ is divided by an integer m, into an array of m equally spaced values and the processor determines $\mu_{i,t}$ and $V(W_i(t))$ from the value within this array that optimizes the sum in the right-hand side of the Bellman equation. For example, for computational purposes m may be set to 15.

To solve Equation 31, the processor sets t=T-1 and solves Equation 31 to determine $\mu_{i,T-1}$ and each $V(W_i(T-1))$ for each i that is a member of the set of $[-i_{max}(T-1), i_{max}(T-1)]$. The processor then continues backwards in time to t=T-2, t=T-3, etc., until t=0. The value of $V(W_0(0))$ is the optimal probability of the investor attaining their wealth goal G given their initial wealth $W_0(0)=W_{init}$.

To determine the probability distribution for the investor's wealth at future times, the processor uses the optimal strategy information, $\mu_{i,t}$ and $\sigma_{i,t}$, determined from Equation 31 and the corresponding volatility on the efficient frontier 400 to evolve the probability distribution forward in time, starting with t=0, then t=1, ending at t=T-1. At any given value of t, the processor determines for each j that is a member of the set of $[-i_{max}(T-1), i_{max}(T-1)]$ $$p(W_j(t+1)) = \sum_{i=-i_{max}(t)}^{i_{max}(t)} p(W_j(t+1)|W_i(t), \mu_{i,t}) \cdot p(W_i(t)) \quad \text{Equation 32}$$

Starting with p(W(0))=1, the processor generates the entire set of probabilities for t=1. Then moving forward in time, the processor recursively applies Equation 32, until it obtains the probability distribution or the wealth nodes in every year of the lifetime of the portfolio.

Incorporation of a Bankruptcy Factor

As outlined above, there are external time constraints on the operation of this system. As a result, computational time must be streamlined. As an individual cannot hold negative funds, the processor may incorporate a bankruptcy factor. It would seem intuitive to set the bankruptcy factor at 0, because at that level, the investor would be bankrupt. However, the selection of such a bankruptcy factor has significant negative implications from a computational point of view. Specifically, because the points on the wealth grid have approximate equal logarithmic spacing, there will be a concentration of lower wealth values in the grid that are of no value to the investor whose goals are in terms of tens of thousands of dollars—not single dollars.

As a result, the bankruptcy factor will be linked to the minimum balance provided by the investor. For example, the bankruptcy factor $i_{pos}(t)$ may be set at ten (10) twenty (20), thirty (30) forty (40) or even fifty (50) percent of the minimum balance previously provided by the investor. The notation "pos" reflects the fact that $W_i(t)+C_i(t)$ is positive. In this regard, $W_i(t)+C_i(t) > i_{pos}(t)$. That means that for each $i < i_{pos}(t)$, the investor is bankrupt and cannot achieve their goals.

If $i_{pos}(t)$ fails to exist at any time t, it means that the investor is guaranteed to be bankrupt at that time t. Conversely, if $i_{pos}(t)$ exists, computation time may be streamlined by having the processor: (a) obtain $W_{-i_{max}(t)}(t)$ from $W(t)$ in Equations 25 and 26 by setting $W(t-1)=W_{i_{pos}(t-1)}(t-1)$ instead of $W_{-i_{max}(t-1)}(t-1)$; (b) determine the transition probabilities, $p(W_j(t+1)|W_i(t), \mu)$ for Equation 31 for only i values where $i \geq i_{pos}(t)$; and (c) sum i from $i_{pos}(t)$ to $i_{max}(t)$ instead of from $-i_{max}(t)$ to $i_{max}(t)$. Simply put, the introduction of a bankruptcy factor significantly reduces the amount of extraneous calculations.

Multiple Portfolios

In certain embodiments, the system may include multiple portfolios with each portfolio directed to an independent goal. Furthermore, such portfolios may be managed in parallel or series.

System Interaction with Users

In certain embodiments, a constraint linked to each financial asset may be uploaded to the database by a financial advisor or an employee, contractor, or agent of the financial advisor. Examples of such constraints are each asset's environmental, social, and governance (ESG) scores. In certain embodiments, the investor may designate a minimum ESG score that they wish for the portfolio to maintain. In such embodiments, the processor may not only seek to maximize the portfolio's probability of obtaining the investor's desired goal, but also seek to maximize the portfolio's ESG scores.

In certain embodiments, the system includes guardrails. Such guardrails may prevent Conservative investors, who may have aggressive goals, from taking on too much risk. In such an embodiment, investors are categorized into groups based on a risk profile uploaded to the database by a financial advisor or an employee, contractor, or agent of the financial advisor. In addition, a guardrail factor for each classification may be uploaded by a financial advisor or an employee, contractor, or agent of the financial advisor. Such a guardrail factor may be from 0 and 100 and will restrict how far up the efficient frontier 400 any portfolio may be located. By restricting how far up the efficient frontier 400 the portfolio is, the guardrail factor restricts the amount of risk the investor may take on.

By way of example, the investors may be classified as "Conservative", "Moderate" or "Aggressive" depending on their traditional risk appetite. The guardrails for "Conservative" investors may be 50, for "Moderate" investors may be 75 and there may be no guardrail factor entered for "Aggressive" investors. If there is no guardrail factor uploaded, the investor would have access to the entire range of portfolios on the efficient frontier 400. With such guardrail factors in place, "Conservative" investors are restricted to the bottom 50% of the efficient frontier. Similarly, "Moderate" investors may proceed up to 75% of the efficient frontier 400, and investors classified as "Aggressive" have no restrictions on how far up the efficient frontier 400 they may proceed.

Simply put the guardrail factor sets the maximum for both the first apportionment factor and second apportionment factor. By way of example, if a "Conservative" investor whose guardrail factor has been set to 50 stated that they wished to pursue a strategy of 80% in favor of maximizing returns in relation to 20% maximizing the probability that the investment balance at the end of the investment timeframe meets the target goal, which would result in a first apportionment factor of 80, the guardrail factor overrides the investor's election and sets the first apportionment factor to 50.

In other embodiments, the guardrail factor may incorporate the investor's selection by using the guardrail factor to set the top end of the investor's range. For example, if a "Conservative" investor whose guardrail factor has been set to 50 stated that they wished to pursue a strategy of 80% in favor of maximizing returns in relation to 20% maximizing the probability that the investment balance at the end of the investment timeframe meets the target goal, the apportionment factor is set to 40 (i.e., 50×0.80=40). In summary, the incorporation of a risk profile provides a check against investors taking on more risk than they may actually be comfortable with.

In other embodiments, the system employs a crash threshold. Such a crash threshold is uploaded to the database by a financial advisor or an employee, contractor, or agent of the financial advisor. The crash threshold may be a numeric value or a technical chart pattern. In certain embodiments, the system continuously monitors and assigns a market risk score based on a number of factors including market capitalization, volatility, and the market's 50-day and 200-day moving averages.

For example, the crash threshold may be set to look for a technical market pattern know as a "death-cross" wherein the 50-day moving average falls below the 200-day moving average. When the system identifies such a technical pattern, the system may automatically reduce the portfolio's risk by moving the portfolio down the efficient frontier to the optimal probability point. Conversely, if the crash threshold is breached, the system may move all the investor's portfolio holdings to "Risk Off" portfolios which are a parallel set of portfolios uploaded to the database by a financial advisor or an employee, contractor, or agent of the financial advisor which are created specifically to protect against a market crash. This shift is over and above any pre-determined reallocation schedules and is more an event based trigger. The system then stays put on these "Risk Off" portfolios till the market passes back through the crash threshold a second time, indicating the possibility of a market crash has subsided. Again, the crash threshold is subjective and may be transmitted by the investor via the software application or uploaded to the database by a financial advisor or an employee, contractor, or agent of the financial advisor.

System Components

A non-limiting embodiment of the system includes a general-purpose computing device, having a processing unit (CPU or processor), and a system bus that couples various system components including the system memory such as read only memory (ROM) and random-access memory (RAM) to the processor. The system can include a storage device connected to the processor by the system bus. The system can include interfaces connected to the processor by the system bus. The system can include a cache of high-speed memory connected directly with, in close proximity to, or integrated as part of the processor. The system can copy data from the memory and/or a storage device to the cache for quick access by the processor. In this way, the cache provides a performance boost that avoids processor delays while waiting for data. These and other modules stored in the memory, storage device, or cache can control or be configured to control the processor to perform various actions. Other system memory may be available for use as well. The memory can include multiple different types of memory with different performance characteristics.

Computer Processor

The invention may operate on a computing device with more than one processor or on a group or cluster of computing devices networked together to provide greater processing capability. The processor can include any general-purpose processor and a hardware module or software module, stored in an external or internal storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

For clarity purposes, an illustrative system embodiment is presented as having individual functional blocks including functional blocks labeled as a "processor." The functions such blocks represent may be provided through the use of either shared or dedicated hardware, including, but not limited to, hardware capable of executing software and hardware, such as a processor, that is purpose-built to operate as an equivalent to software executing on a general-purpose processor. For example, the functions of one or more processors may be provided by a single shared processor or multiple processors and use of the term "processor" should not be construed to refer exclusively to hardware capable of executing software. Illustrative embodiments may include microprocessor and/or digital signal processor (DSP) hardware, read-only memory (ROM) for storing software performing the operations discussed in this document, and random-access memory (RAM) for storing results. Very large-scale integration (VLSI) hardware embodiments, as well as custom VLSI circuitry in combination with a general-purpose DSP circuit, may also be provided.

System Bus

The system bus may be any of several types of bus structures including a memory bus or memory controller, a peripheral bus, and a local bus using any of a variety of bus architectures. A basic input/output system (BIOS) stored in ROM or the like may provide the basic routine that helps to transfer information between elements within the computing device, such as during start-up.

Storage Device

The computing device can further include a storage device such as a hard disk drive, a magnetic disk drive, an optical disk drive, a solid-state drive, a tape drive or the like. Similar to the system memory, a storage device may be used to store data files, such as location information, menus, software, wired and wireless connection information (e.g., information that may enable the mobile device to establish a wired or wireless connection, such as a USB, Bluetooth, or wireless network connection), and any other suitable data. Specifically, the storage device and/or the system memory may store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld, computing device, a desktop computer, or a computer server.

Although an embodiment described in this document uses cloud computing and cloud storage, it should be appreciated by those skilled in the art that other types of computer-readable media which can store data that are accessible by a computer, such as magnetic cassettes, flash memory cards, digital versatile disks, cartridges, random access memories (RAMS), read only memories (ROMS), a cable or wireless signal containing a bit stream and the like, may also be used in the operating environment. Furthermore, non-transitory computer-readable storage media as used in this document include all computer-readable media, with the sole exception being a transitory propagating signal per se.

Interface

To enable user interaction with the computing device, an input device represents any number of input mechanisms, such as a microphone for speech, a web camera for video, a touch-sensitive screen for gesture or graphical input, a keyboard, a mouse, a motion input, and so forth. An output device can also be one or more of a number of output mechanisms known to those of skill in the art such as a display screen, speaker, alarm, and so forth. In some instances, multimodal systems enable a user to provide multiple types of input to communicate with the computing device. The communications interface generally governs and manages the user input and system output. Furthermore, one interface, such as a touch screen, may act as an input, output and/or communication interface.

There is no restriction on operating on any particular hardware arrangement and therefore the basic features disclosed may easily be substituted for improved hardware or firmware arrangements as they are developed.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor, then these modules may be loaded into RAM or memory at runtime or may be stored as would be known in the art in other computer-readable memory locations. Having disclosed some components of a computing system, the disclosure now turns to a description of cloud computing, which is the preferred environment of the invention.

Cloud System

Cloud computing is a type of Internet-based computing in which a variety of resources are hosted and/or controlled by an entity and made available by the entity to authorized users via the Internet. A cloud computing system can be configured so that a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network-enabled computing devices. For example, cloud computing resources can communicate with a server, a database, and/or any other network-enabled computing device to provide the cloud resources.

In some cases, the cloud resources can be redundant. For example, if cloud computing resources are configured to provide data backup services, multiple copies of the data can be stored such that the data are still available to the user even if a storage resource is offline, busy, or otherwise unavailable to process a request. In another example, if a cloud computing resource is configured to provide software, then the software can be available from different cloud servers so that the software can be served from any of the different cloud servers. Algorithms can be applied such that the closest server or the server with the lowest current load is selected to process a given request.

User Terminal

A user interacts with cloud computing resources through user terminals or testing devices connected to a network by direct and/or indirect communication. Cloud computing resources can support connections from a variety of different electronic devices, such as servers; desktop computers; mobile computers; handheld communications devices (e.g., mobile phones, smart phones, tablets); set top boxes; network-enabled hard drives; and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. In other cases, however, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platforms as a Service (PaaS), Infrastructure as a Service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources such as servers or databases.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of the cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

Collection of Data

In some configurations, during the creation or maintenance of the portfolio described above, a storage device or resource can be used to store relevant data. Examples of the data contemplated for storage are user personal data, location data, and employment data. The data stored can be incorporated into the disclosed system and methods used to refine the efficient frontier 400 to adjust for asymmetric goals such as tax issues and restrictions on the investor's holding options based on employment status. In addition, collected data may be used for single command responses to update inquiries propounded by the system in response to a personal or market-driven event (e.g., the investor loses their job, or the market drops 5%).

User Personal Data

The invention contemplates that, in some instances, this gathered data might include user personal and/or sensitive data. The invention further contemplates that the entities responsible for the collection, analysis, disclosure, transfer, storage, or other use of such data should implement and consistently use privacy policies and practices that are generally recognized as meeting or exceeding industry or governmental requirements for maintaining personal information and keeping data private and secure. For example, personal data from users should be collected for legitimate and reasonable uses of the entity and not shared or sold outside of those legitimate uses. Further, such collection should occur only after the informed consent of the users. In addition, such entities should take any needed steps to safeguard and secure access to such personal data and ensure that others with access to the personal data adhere to their privacy and security policies and procedures. Further, such entities can subject themselves to evaluation by third parties to certify their adherence to widely accepted privacy policies and practices.

User Opt-Out

Despite the foregoing, the invention also contemplates embodiments in which users selectively block the use of, or access to, personal data. That is, the invention contemplates that hardware and/or software elements can be provided to prevent or block access to such personal data. For example, the present technology can be configured to allow users to select the data that are stored in cloud storage. In another example, the present technology can also be configured to allow a user to specify the data stored in cloud storage that can be shared with any advisors or third-party financial institutions.

Therefore, although the invention broadly covers use of personal data to implement one or more various disclosed embodiments, the invention also contemplates that the various embodiments can also be implemented without the need for accessing such personal data. That is, the various embodiments of the present technology are not rendered inoperable due to the lack of all or a portion of such personal data.

Incorporation of Additional Parameters

Social Analysis

As described above, in some configurations, the data contemplated for storage are user personal data for social analysis purposes. Many a time, investors do not know what their financial goals are, or find it difficult to articulate them. In certain embodiments, with the investor's permission social media data may be collected to help investors create or articulate financial goals for themselves. The system may use the collected personal data outlined above to identify the interests of specific individuals with the purpose being a deeper understanding of the individual's specific goals. For example, the personal data that are collected may suggest that an individual supports clean air initiatives. The system may then seek to construct a portfolio in compliance with the individual's moral and ethical goals, as well as their financial goals. For example, the portfolio may only be constructed of assets and companies that are certified as carbon neutral by a recognized agency.

EXAMPLES

The following examples are included to more clearly demonstrate the overall nature of the invention. The example illustrates the improved computational speed obtained by utilizing applicant's system. These examples are exemplary, not restrictive, of the invention.

For the example, it is assumed that the investor begins with a $100 investment at t=0, so W(0)=100. The investor's goal is to maximize their probability of reaching a goal wealth of $200 after 10 years. No cash flows are initially present. The base case value for pgrid, grid point density per minimum annual standard deviation in the portfolio's performance, is 3.0. The number of potential portfolios along the efficient frontier is set at 15.

The efficient frontier 400 arising from the investments available to the investor is generated from historical returns from the 20-year period between January 1998 to December 2017 for: (i) Vanguard® Total Bond Market II Index Fund Investor Shares (VTBIX), (ii) Vanguard® Total International Stock Index Fund Investor Shares (VGTSX), and (iii) Vanguard® Total Stock Market Index Fund Investor Shares (VTSMX). The summary statistics on returns from January 1998 to December 2017 for the three identified index funds are depicted in Table 1 below.

TABLE 1

| Index Fund Category | Mean Return | Covariance of Returns | | |
|---|---|---|---|---|
| U.S. Bonds | 0.0493 | 0.0017 | −0.0017 | −0.0021 |
| International Stocks | 0.0770 | −0.0017 | 0.0396 | 0.03086 |
| U.S. Stocks | 0.0886 | −0.0021 | 0.0309 | 0.0392 |

The data from Table 1 is used in conjunction with Equations 2-10 to generate the efficient frontier 400. The range for $\mu$ is restricted so that $\mu_{min} \leq \mu \leq \mu_{max}$. For this example, $\mu_{min}=0.0526$ which corresponds to the lowest possible portfolio standard deviation on the efficient frontier 400, which is $\sigma=0.0374$. Furthermore, $\mu_{max}=0.0886$, the highest mean return of the three index funds, which avoids long-short portfolios. This value of $\mu_{max}$ corresponds to $\sigma=0.1954$. Again, this example employs 15 portfolios whose $\mu$ values are equally spaced over the interval $[\mu_{min}], [\mu_{max}]$, so m=15. As a result, at each year and wealth node in the state space, the disclosed system determines which of the 15 portfolios is optimal.

Figure 9:
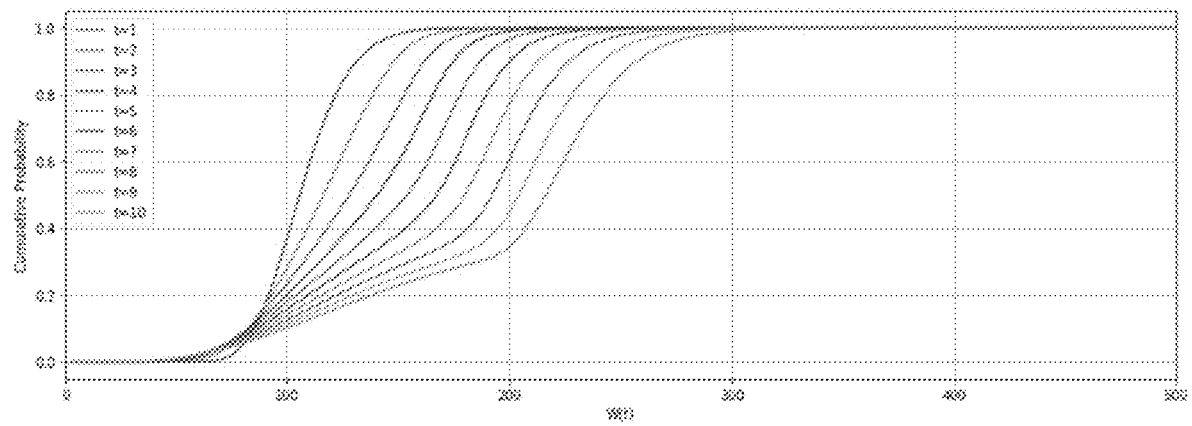
FIG. 9 shows the cumulative distribution of wealth for all t=1, 2, 3, 4, 5, 6, 7, 8, 9, and 10 years for the example below.

Employing Equations 27-32, it is found that the highest achievable probability of reaching the goal wealth or more is Pr[W(T)≥G=200]=0.669. The initial portfolio has $\mu=0.0835$ and $\sigma=0.1686$. FIG. 9 shows the cumulative distribution of wealth for all t=1, 2, . . . , 10 years. The evolution of this distribution shows the shift of these wealth distributions to the right as time proceeds, but, more interestingly, it also shows the adjustments the distribution shape makes so as to maximize the probability of exceeding the value of G=200 by the final year T=10. In the earlier years, the distribution has a slight positive skew, as is the case for a lognormal distribution, but the adjustments to attain the goal wealth eventually reverse this and create a negative skew to the distribution as it progresses to its time horizon.

Figure 10:
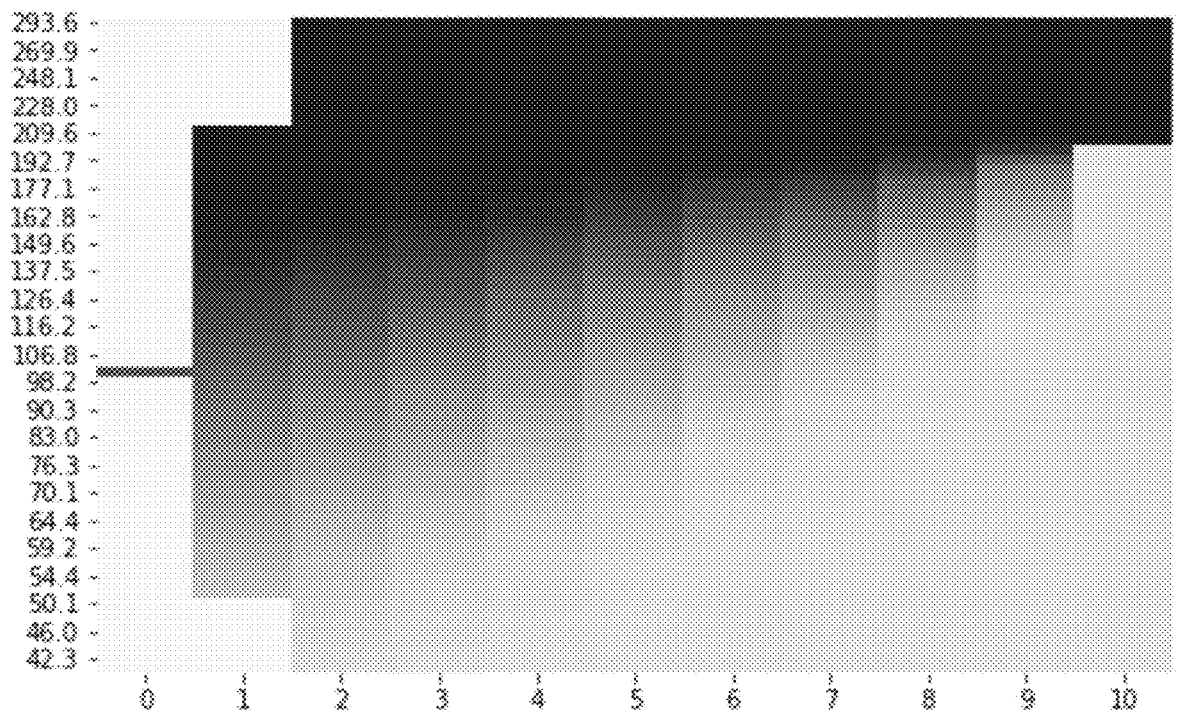
FIG. 10 shows the optimal probability of reaching the investor's goal wealth of 200 in the example below at each point in time and for any level of wealth in the state space.

FIG. 10 shows the optimal probability of reaching the investor's goal wealth G=200 (i.e., the value function) at each point in time and for any level of wealth in the state space; that is, at each {t, Wi(t)} grid point. As is expected, higher wealth levels are associated with higher probabilities of reaching the goal wealth. FIG. 10 also reflects the fact that at the final time T=10, there is more certainty about whether the goal wealth will be attained.

Figure 11:
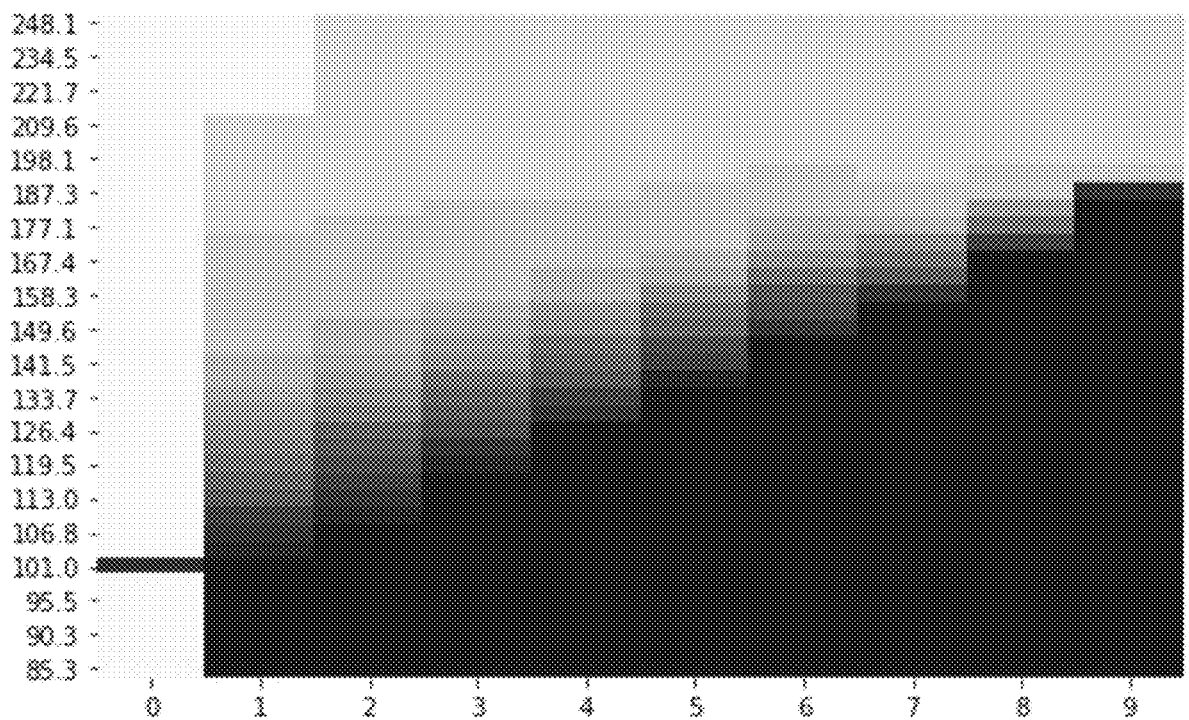
FIG. 11 shows the optimal portfolio strategy at each {t, Wi(t)} grid point for the example below.

FIG. 11 depicts the optimal portfolio strategy at each {t, Wi(t)} grid point for the present example. That is, which of the 15$\mu$ values are optimal, where portfolio number 0 corresponds to $\mu_{min}$ and portfolio number 14 corresponds to $\mu_{max}$. When the portfolio has a lot of money, it moves towards lower portfolio numbers, since the corresponding decrease in volatility makes it less likely to incur big losses that could remove investors from the path to attaining the goal wealth that they are currently on. When the portfolio has less money, it moves towards higher portfolio numbers, since the increase in both expected return and volatility makes it more likely to attain the goal wealth.

In Table 2, the effect of changing the number of intermediate strategies, m, is investigated. Because the efficient frontier 400 is part of a hyperbola, it becomes progressively linear as μ increases. This means the intermediate strategies matter more near $\mu_{min}$. Table 2 depicts that 15 strategies, m=15, is more than sufficient for providing enough accuracy in determining the probability of the initial investment $W_{init}$=100 gaining at least 50% and at least 100% of its initial worth after 10 years. The table also shows that the rate of growth in the run time as m increases is approximately linear.

TABLE 2

| Value of m | Run time (sec.) | Pr [W (T) ≥ G = 150] | Pr [W (T) ≥ G = 200] |
|---|---|---|---|
| 5 | 1.8 | 0.775 | 0.665 |
| 10 | 2.4 | 0.776 | 0.668 |
| 15 | 2.9 | 0.777 | 0.669 |
| 20 | 3.4 | 0.777 | 0.669 |
| 40 | 8.5 | 0.777 | 0.669 |
| 60 | 12 | 0.777 | 0.669 |
| 80 | 15 | 0.777 | 0.669 |
| 100 | 18 | 0.777 | 0.669 |

The runtimes were obtained on an Apple Computer iMac with a i5 intel processor and 16 GB of RAM.

In Table 3, the effect of changing the grid point density (pgrid), recalling that pgrid represents the number of grid points (i.e., wealth nodes) per $\sigma_{min}$, the minimum annual portfolio volatility, is investigated. The table also shows that the rate of growth in the run time as pgrid increases has an exponent of 1.5, directly between linear and quadratic growth.

TABLE 3

| Value of pgrid | Run time (sec.) | Pr [W (T) ≥ 150] | Pr [W (T) ≥ G = 200] |
|---|---|---|---|
| 1.0 | 0.64 | 0.777 | 0.662 |
| 1.5 | 1.1 | 0.776 | 0.673 |
| 2.0 | 1.6 | 0.780 | 0.676 |
| 2.5 | 2.2 | 0.773 | 0.666 |
| 3.0 | 2.9 | 0.777 | 0.669 |
| 3.5 | 3.7 | 0.780 | 0.673 |
| 4.0 | 4.6 | 0.779 | 0.674 |
| 4.5 | 5.5 | 0.778 | 0.669 |
| 5.0 | 6.5 | 0.777 | 0.670 |
| 5.5 | 7.7 | 0.779 | 0.673 |
| 6.0 | 9.5 | 0.778 | 0.668 |

Table 4 depicts how constant annual infusions of C (t)=1, 2, ..., 9 thousand dollars affect the maximum probability of reaching the goal in this example, as well as the probability of reaching at least 150 thousand dollars. As Table 4 indicates, even small infusions can have a significant effect on increasing these probabilities.

TABLE 4

| Value of C(t) | Pr [W (T) ≥ 150] | Pr [W (T) ≥ G = 200] |
|---|---|---|
| 0 | 0.777 | 0.669 |
| 1,000 | 0.832 | 0.730 |
| 2,000 | 0.881 | 0.789 |
| 3,000 | 0.926 | 0.848 |
| 4,000 | 0.961 | 0.901 |

TABLE 4-continued

| Value of C(t) | Pr [W (T) ≥ 150] | Pr [W (T) ≥ G = 200] |
|---|---|---|
| 5,000 | 0.984 | 0.944 |
| 6,000 | 0.996 | 0.976 |
| 7,000 | 0.999 | 0.992 |
| 8,000 | 0.999 | 0.998 |
| 9,000 | 0.999 | 0.999 |

Finally, Table 5 shows the effect of constant annual withdrawals instead of infusions. In such an example C(t) is a negative constant. As Table 5 depicts, should the annual withdrawal amount become significant, the investor will now risk bankruptcy (i.e., W (T)=0). Furthermore, Table 5 shows how increasing the withdrawal rate increases the chance of the investor going bankrupt, while decreasing both the probability of reaching 150 thousand dollars and the probability of reaching the goal wealth of 200 thousand dollars at time T=10.

TABLE 5

| Value of C(t) | Pr [W (T) = 0] | Pr [W (T) ≥ G = 150] | Pr [W (T) ≥ G = 200] |
|---|---|---|---|
| 0 | 0 | 0.777 | 0.669 |
| −1,000 | 0 | 0.720 | 0.609 |
| −5,000 | 0.002 | 0.491 | 0.387 |
| −10,000 | 0.124 | 0.246 | 0.182 |
| −15,000 | 0.492 | 0.099 | 0.072 |
| −20,000 | 0.796 | 0.034 | 0.021 |
| −25,000 | 0.937 | 0.004 | 0.001 |

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges. It is also expressly intended that the steps of the methods of using the various devices disclosed above are not restricted to any particular order.

What is claimed:

1. A system for constructing and dynamically maintaining a goals-based investment portfolio having an investment balance, the system comprising:
a software application, the application operating on a mobile computer device or on a computer device, which is in communication with an investor, the application is configured to receive the following subject information from the investor: (a) an investment timeframe, (b) an initial balance, (c) a target balance, (d) a minimum balance, (e) a first minimum probability factor defining the minimum probability that the investment balance will meet or exceed the target balance at the end of the investment timeframe, (f) a second minimum probability factor defining the minimum probability that the investment balance will meet or exceed the minimum balance at the end of the investment timeframe, (g) a first apportionment factor defining a division between a strategy directed to maximize the investment balance versus a strategy directed to increasing the probability that the investment balance will meet or exceed the target balance at the end of the investment timeframe, (h) a second apportionment factor defining a division between a strategy directed to increasing the probability that the investment balance will meet or exceed the target balance at the end of the investment timeframe versus a strategy directed to increasing the probability that the investment balance will meet or exceed the minimum balance at the end of the investment timeframe, wherein, the software application is further configured to communicate the subject information through a wired and/or wireless communication network to a server located at a site where an advisor is physically present or at a location remote from the site; and a processor that is in communication through the wired and/or wireless communication network with the software application, as well as the server, the processer is configured to recall from a database of the system, upon communication of the subject information to the server: (a) a plurality of available financial assets to construct or amend the portfolio, (b) a constraint linked to each financial asset, (c) future projections or historical data linked to each financial asset, (d) present value of the assets from markets on which the assets are listed, (e) predetermined intervals at which the assets composition of the portfolio may be adjusted, and (f) set intervals at which the present value of the assets are reassessed, wherein the available financial assets, constraints, future projections, historical data, predetermined intervals, and set intervals have been previously uploaded to the database by a financial advisor or an employee, contractor, or agent of the financial advisor;

whereby the processor determines a projected return and inherent risk for each asset based on the present value and future projections or historical data;

whereby the processor plots on a x-y chart at set intervals: (a) a goal threshold based on the investment timeframe, investment balance, target balance, first minimum probability factor, and potential return and inherent risk for each financial asset, (b) a loss threshold based on the investment timeframe, investment balance, target balance, second minimum probability factor, and potential return and inherent risk for each financial asset, and (c) an efficient frontier based on the projected returns and inherent risks of all assets;

whereby the processor determines an upper goal point as the right-most intersection, if any, of the goal threshold and the efficient frontier;

whereby the processor determines a loss point as the right-most intersection of the loss threshold and the efficient frontier;

whereby the processor determines an optimal probability point defined as a tangential point of intersection between the goal threshold and the efficient frontier achieved by increasing or decreasing the first minimum probability factor until tangency is achieved;

whereby the processor determines a good-state point by apportioning the distance between the optimal probability point and the upper goal point along the efficient frontier based on the first apportionment factor;

whereby the processor determines a bad-state point by apportioning the distance between the optimal probability point and the loss point along the efficient frontier based on the second apportionment factor;

whereby when the loss point is to the right of the upper goal point, the processor constructs or adjusts the holdings of the portfolio to align with a risk-return profile of the good-state point;

whereby when the loss point is to the left of the upper goal point but to the right of the optimal probability factor, the processor constructs or adjusts the holdings of the portfolio to align with the left-most point of (a) the loss point or (b) the good-state point; and whereby when the loss point is to the left of the optimal probability factor, the processor constructs or adjusts the holdings of the portfolio to align with the bad-state point.

2. The system of claim 1, wherein the first minimum probability factor is from 0 to 100.

3. The system of claim 1, wherein the second minimum probability factor is from 0 to 100.

4. The system of claim 1, wherein the second minimum probability factor is greater than or equal to the first minimum probability factor.

5. The system of claim 1, wherein the first apportionment factor is from 0 to 100.

6. The system of claim 1, wherein the second apportionment factor is from 0 to 100.

7. The system of claim 1, wherein the processer is configured to recall from a database of the system both the future projections and the historical data linked to each financial asset.

8. The system of claim 1, whereby the processor actively monitors the market and at the predetermined intervals updates the present value, the projected return, and inherent risk for each asset and subject to such adjustments sends out buy and sell orders to brokers to amend the holdings of the portfolio.

9. A method for constructing and dynamically maintaining an investment balance of a goals-based investment portfolio, the method comprising:

receiving the following individual investor goal profile that has been provided by an investor using a software application operating on a mobile computer device or a computer device that is synchronized with the mobile computer device: (a) an investment timeframe, (b) an initial balance, (c) a target balance, (d) a minimum balance, (e) a first minimum probability factor defining the minimum probability that the investment balance will meet or exceed the target balance at the end of the investment timeframe, (f) a second minimum probability factor defining the minimum probability that the investment balance will meet or exceed the minimum balance at the end of the investment timeframe, (g) a first apportionment factor defining a division between a strategy directed to maximize the investment balance versus a strategy directed to increasing the probability that the investment balance will meet or exceed the target balance at the end of the investment timeframe, (h) a second apportionment factor defining a division between a strategy directed to increasing the probability that the investment balance will meet or exceed the target balance at the end of the investment timeframe versus a strategy directed to increasing the probability that the investment balance will meet or exceed the minimum balance at the end of the investment timeframe, whereby the mobile computer device and the computer device communicate with a remote server of the system located at a site where an advisor is physically present or at a location remote from the site through wired and/or wireless communication networks;

upon receiving the goal profile in the system, calling up: (a) a plurality of available financial assets to construct or amend the portfolio, (b) a constraint linked to each financial asset, (c) future projections or historical data linked to each financial asset, (d) present value of the assets from markets on which the assets are listed, (e) predetermined intervals at which the assets composition of the portfolio may be adjusted, and (f) set intervals at which the present value of the assets is reassessed, wherein the available financial assets, constraints, future projections, historical data, predetermined intervals, and set intervals have been previously uploaded to the database by a financial advisor or an employee, contractor, or agent of the financial advisor;

actively monitoring at least one financial market on which each asset is traded;

determining a projected return and inherent risk for each asset based on the present value and future projections or historical data;

plotting on a x-y chart at set intervals: (a) a goal threshold based on the investment timeframe, investment balance, target balance, first minimum probability factor, and potential return and inherent risk for each financial asset, (b) a loss threshold based on the investment timeframe, investment balance, target balance, second minimum probability factor, and potential return and inherent risk for each financial asset, and (c) an efficient frontier based on the projected returns and inherent risks of all assets;

determining an upper goal point as the right-most intersection, if any, of the goal threshold and the efficient frontier, a loss point as the right-most intersection of the loss threshold and the efficient frontier, an optimal probability point defined as a tangential point of intersection between the goal threshold and the efficient frontier achieved by increasing or decreasing the first minimum probability factor until tangency is achieved, a good-state point by apportioning the distance between the optimal probability point and the upper goal point along the efficient frontier based on the first apportionment factor, a bad-state point by apportioning the distance between the optimal probability point and the loss point along the efficient frontier based on the second apportionment factor; and constructing a portfolio based on the location of the upper goal point, optimal goal point, and loss point.

10. The method of claim 9 further comprising:

when the loss point is to the right of the upper goal point, the processor constructs or adjusts the holdings of the portfolio to align with a risk-return profile of the good-state point;

when the loss point is to the left of the upper goal point but to the right of the optimal probability factor, the processor constructs or adjusts the holdings of the portfolio to align with the left-most point of (a) the loss point or (b) the good-state point; and when the loss point is to the left of the optimal probability factor, the processor constructs or adjusts the holdings of the portfolio to align with the bad-state point.

11. The method of claim 9, wherein the first minimum probability factor is from 0 to 100.

12. The method of claim 9, wherein the second minimum probability factor is from 0 to 100.

13. The method of claim 9, wherein the second minimum probability factor is greater than or equal to the first minimum probability factor.

14. The method of claim 9, wherein the first apportionment factor is from 0 to 100.

15. The method of claim 9, wherein the second apportionment factor is from 0 to 100.

16. The method of claim 9, wherein the processer is configured to recall from a database of the system both the future projections and the historical data linked to each financial asset.

17. The method of claim 9, further comprising updating at the predetermined intervals the present value, the projected return, and inherent risk for each asset based on the active monitoring of the at least one financial market on which each asset is traded.

18. The method of claim 9, further comprising sending out at least one buy or sell order to a broker to rearrange the holdings of the portfolio.

19. A system for optimizing the probability of a goals-based investment portfolio meeting a target balance, the system comprising:

a software application, the application operating on a mobile computer device or on a computer device, which is in communication with an investor, the application is configured to receive the following subject information from the investor: (a) an investment timeframe, (b) an initial balance, (c) the target balance, (d) a minimum balance, (e) predetermined intervals at which the assets composition of the portfolio may be adjusted, (f) a minimum probability desired to meet the target balance, and (g) optionally, a maximum probability desired to meet the target balance, wherein, the software application is further configured to communicate the subject information through a wired and/or wireless communication network to a server located at a site where an advisor is physically present or at a location remote from the site; and a processor that is in communication through the wired and/or wireless communication network with the software application, as well as the server, the processer is configured to recall from a database of the system, upon communication of the subject information to the server: (a) a plurality of available financial assets to construct or amend the portfolio, (b) a constraint linked to each financial asset, (c) future projections or historical data linked to each financial asset, (d) present value of the assets from markets on which the assets are listed, and (e) set intervals at which the present value of the assets are reassessed, wherein the available financial assets, constraints, future projections, historical data, and set intervals have been previously uploaded to the database by a financial advisor or an employee, contractor, or agent of the financial advisor;

whereby within a reasonable time, not to exceed sixty (60) seconds, the processor:

determines a projected return and inherent risk for each asset based on the present value and future projections or historical data;

determines a projected portfolio wealth value at each predetermined interval within;

determines the probability that the projected portfolio wealth value will be greater than or equal to the target balance at the end of the investment timeframe;

compares the probability of meeting the target balance at the end of the investment timeframe with the minimum probability and optionally the maximum probability, and when the probability of meeting the target balance at the end of the investment timeframe is less than the minimum probability, the processor determines a yearly infusion or a one-time lumpsum infusion amount that will raise the probability of meeting the target balance at the end of the investment timeframe to at least the minimum probability, and optionally when the probability of meeting the target balance at the end of the investment timeframe is greater than the maximum probability, the processor determines a yearly withdrawal or one-time lump sum withdrawal amount that will reduce the probability of meeting the target balance at the end of the investment timeframe to at least the maximum probability; and notifies the investor of the yearly infusion or one-time lumpsum infusion amount or optional yearly withdrawal or one-time lumpsum withdrawal amount.

20. The system of claim 19, wherein the application is further configured to receive the following subject information from the investor: (a) a bank account number, located at a financial institution, and a corresponding routing number, and (b) an authorization for the application to request withdrawals and make deposits to the bank account.

* * * * *